United States Patent
Ferlitsch

(10) Patent No.: US 7,319,533 B2
(45) Date of Patent: *Jan. 15, 2008

(54) SYSTEM FOR FACE-UP PRINTING FROM A DUPLEX PRINTER

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 691 days.

This patent is subject to a terminal disclaimer.

(21) Appl. No.: 10/337,708

(22) Filed: Jan. 6, 2003

(65) Prior Publication Data

US 2004/0130741 A1   Jul. 8, 2004

(51) Int. Cl.
  *G06F 15/00*  (2006.01)
  *G06F 3/15*   (2006.01)
(52) U.S. Cl. ..................................... 358/1.13; 358/1.15
(58) Field of Classification Search ............... 358/1.13, 358/1.15, 1.9, 1.2, 1.115
See application file for complete search history.

(56) References Cited

U.S. PATENT DOCUMENTS

| 5,615,314 | A | 3/1997 | Schoenzeit et al. |
| 5,749,024 | A * | 5/1998 | Young .......................... 399/85 |
| 5,970,221 | A | 10/1999 | Bolash et al. |
| 6,172,765 | B1 * | 1/2001 | Kawamoto .................. 358/1.2 |
| 6,825,943 | B1 * | 11/2004 | Barry et al. ............... 358/1.15 |
| 6,992,789 | B2 * | 1/2006 | Czyszczewski et al. ... 358/1.18 |
| 2003/0038964 | A1 * | 2/2003 | Ferlitsch .................... 358/1.15 |

* cited by examiner

Primary Examiner—Gabriel I. Garcia
(74) Attorney, Agent, or Firm—Chernoff, Vilhauer, McClung & Stenzel

(57) ABSTRACT

Systems for providing collated, face-up printer output. These systems may utilize a page-independent spool index file that may be manipulated to produce collated, face-up printer output that may not otherwise be available through a system's hardware or drivers.

23 Claims, 20 Drawing Sheets

SYSTEM FOR FACE-UP PRINTING FROM A DUPLEX PRINTER

BACKGROUND OF THE INVENTION

The present invention relates to a system for face-up printing of documents, and in particular to a system for face-up printing of documents rendered in Tag Independent File Format (TIFF).

Computer applications are often used to create multi-page documents that may be easily and conveniently edited on a computer before a final version is printed to a printer, fax machine, or other such printer device. Existing computer applications typically transmit printing instructions, including page data, page order, etc. to the printer device after being prompted by a user. Printer drivers typically provide the necessary interface between the application and the printer device so that the document is printed as instructed by the application. For example, an application may provide page data to a printer in sequential page order. In order to collate the document preserving the proper page order, a face-down printer should print the pages in the sequential order received by the application while a face-up printer should the reverse the sequential order of pages received by the application. The printer driver or printer will usually perform the function of reversing the sequential order of pages where appropriate.

FIGS. 1 and 2 illustrate one existing system by which instructions from a computer application are transmitted to a printer device. In these FIGS., application 10 initiates a print job through a graphic device interface (GDI) 12. Application 10 may be a word processor, spreadsheet, browser, database program or some other program that runs on an underlying operating system, such as Windows 9x, Windows Me, Windows NT/2000, Windows XP, etc.

The GDI 12 will initially obtain instruction from the printer driver 14 on how to render text characters and other graphical objects on the particular printer device such as the bi-directional printer 16 that is associated with the printer driver 14. In some situations, the printer driver 14 and the GDI 12 may be written in 16-bit code, while the underlying operating system performs mathematical operations in a 32-bit code. In those instances, the 16-bit GDI may pass the print job to a 32-bit GDI 18. Either the 16-bit GDI 12 or the 32-bit GDI 18, whichever is appropriate, may then initiate a spooler process 20.

The spooler process 20 may route the print job to the printer 16 through a router 22 capable of sending the print job to a selective one of any available print providers, which may be a local print provider 24 or a network print provider (not shown). Where printing is to be performed locally, the router 22 sends the print job to a local print provider 24 which writes or "spools" a raw spool file 26 to a disk, usually located on the host computer for later access. This is done to avoid waiting for the printer 16 to complete the print job before control is returned to the application. These steps from initiating the print job to writing to spool file 26 may be repeated many times, and data may be appended to spool file 26 until the application 10 signals that the print job is complete by using, for example, an EndDoc() function. Local print provider 24 may also start a port thread 28 that preferably monitors system resources and determines the best time to start playing back or "de-spooling" the spool file 26 to the printer 16.

When printing is to be performed by a network printer device attached to a network server, the router 22 may route print jobs to a network print provider (not shown). In Windows 9x operating systems the spool file 26 is typically spooled to and de-spooled from the disk on the host computer just as are local print jobs. The network server is contacted only during de-spooling to receive the print job. Windows NT/2000® client machines handle print jobs to network printer devices differently; these machines use remote procedure calls (RPCs) to call the necessary printing application program interfaces (APIs) on the network server. In these NT/2000 scenarios, spooling and de-spooling are handled by the network server. This RPC method can also be used in conjunction with Windows 9x operating systems, if desired.

When the port thread 28 determines that the spool file 26 should be de-spooled, a command, such as StartDoc() function call, may be sent to print processor 32 which then instructs the local print provider 24 to read data from the spool file 26 and forward it to the printer 16 through a port monitor 36 and through the physical port 38 connected with the printer 16. Because the printer 16 is a bidirectional printer, the data from the spool file may also be sent through a language monitor 34. The language monitor 34 and port monitor 36 may be separate components or may be integrated into one monitor. This process of reading data from a spool file 26 and forwarding it to the printer 16 may be repeated several times to complete a print job. This is typically repeated until the end of the file is reached or the print job is cancelled. The combination of spooler process, router, local print provider, print processor, language monitor and port monitor may be referred to collectively as a "spooler" 30.

The system illustrated in FIGS. 1 and 2 employs a "raw format" spool file, i.e. a spool file that is formatted for the specific printer device that is to be used. Accordingly, prior to spooling data to the spool file 26, the application 10 uses the GDI 12 to access the printer driver 14 to identify the format with which graphical objects are rendered on the specific printer 16, and writes to the spool file 26 in that format.

Unfortunately, each model of printer device or series of related models of printer devices will typically have its own unique driver that is either stored on the computer running the application or stored on firmware in some high-end printers. For that reason, using the previously described system to implement application-specific printer instructions across a variety of printing devices may require that the application be compatible with a multitude of existing printer drivers and their associated rendering formats, and also be updated for compatibility with drivers for newly introduced printer devices.

Furthermore, with respect to face-up printing, the aforementioned system requires that the last page of a document be rendered in the spool file before the sheets are printed so that they may be de-spooled in reverse sequential order. This requires storage of the rendered data on the host computer until the entire print job is rendered. When compared to immediate de-spooling of the page data to the printer, these processes can be slow and require expensive hardware and firmware or additional software.

Some of these difficulties can be alleviated through the use of Enhanced Metafile (EMF) files, i.e. device-independent files that contain graphic device interface (GDI) calls that reproduce an application's graphic objects on a printer. EMF files are used to quickly record the device independent printing instructions for a document and return control to the user. After control is returned to the user, the function calls stored in the EMF file are played back to the printer driver associated with the printer in the background.

FIGS. 3 and 4 show one existing system for transmitting instructions from an application to a printing device that uses EMF files. The system shown in these FIGS. usually commences when an application 40 initiates an EMF-format print job through a GDI 50 for a designated printer 68. GDI 50 accesses the printer driver 52 associated with the designated printer 68 to determine whether the driver 52 supports EMF spooling. If the driver 52 supports EMF spooling, GDI 50 writes the instructions for rendering the object in EMF format. In this example the Windows 95® spooler process is 32-bit code, so the GDI 50 passes the print request to the 32-bit GDI (GDI32) 56. GDI 32 subsequently passes the print job to the spooler subsystem 70, which initiates a spooler process 58.

The spooler process 58 passes the print job through a router 60 which routes the print job to a print provider 62 that is connected to the designated printer 68. In this example, a local print provider 62 is used, but a network print provider may also be used. If a network print provider is used, the process employed by the network printer to spool the print job has been discussed with respect to FIGS. 1 and 2. The router 60 may route the print job to the print provider 62 through one or more job requests. For example, in a multi-page print job, each page of the document may comprise a single job request.

The local print provider 62 creates a job description file 64 and adds a record to the job description file 64 each time it receives a job request until all the EMF page files have been spooled and each EMF file name and location is recorded in the job description file 64. When information about the last EMF file in the print job has been recorded, the local print provider 62 will send an EndDoc() function call to the spooler process 58, which signals that the print request is spooled and ready for de-spooling. For multi-page jobs, these steps from initial spooling request 41 to job description file recording 48 are repeated for each page of a print job.

When EMF file spooling is complete, the spooler process 58 sets a ReadyToPrint attribute on the print job and initiates an event 49 that signals the port thread 66 that a print job is available for printing. Port thread 66 responds to this event by determining the best time to start the de-spooling process and, at that time, loads the print processor 72. The print processor 72 will determine that the file format is EMF and call GDI32 56 with a function call 82.

GDI32 56 then reads the job description file 64 which provides the locations of the EMF files associated with each page of the print job. GDI32 56 relays the location of each EMF file, one page at a time, to the GDI 50.

GDI 50 accesses the printer driver 52 associated with the designated printer 68 chosen in application 40, reads page-rendering instructions from the spooled EMF file 54 for the particular page it has received from the GDI32 56, and passes them one at a time to the printer driver 52 which uses as many instructions as are necessary to render the first part of the page. When the 16-bit printer driver 52 renders a part of the page, it passes the printer-specific raw page data back to the GDI 50 which, in turn, passes the raw data to GDI32 56. GDI32 56 then passes the raw data to the spooler process 58 which then follows the same procedures it would for a raw format files as explained above.

Spooler process 58 calls the router 60 to route the print job to printer device 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bidirectional printer 68 specified previously.

A language monitor 74 is used in this example because the destination printer device 68 is a bidirectional printer. When non-bidirectional printers are used a port monitor 76 would be invoked instead of the language monitor 74. A language monitor 74 and port monitor 76 may be separate components or may be integrated into one monitor. The language monitor 74 calls the port monitor 76 to send print job data to the printer 68. The port monitor 76 then sends the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Though the use of EMF files avoids the complexity of ensuring that a given application is compatible with the wide array of drivers for printer devices, printer processes that employ EMF files still require that, with respect to face-up printing, the last page of the document be rendered in the spool file before the sheets are printed.

If the printer device contains no firmware, as is often the case, the print data must be fully rasterized into a bitmap of the entire side of the sheet or page. The size of the bitmap is the product of the dots per inch (dpi), the square area of the printable image, in inches, and the bit-depth. For example, a 360 dpi, 24-bit image on an 8½×11 inch sheet of paper would require 36.34 Megabytes of space if fully rasterized. As another example, a double-sided, eight sheet 24-bit full color brochure printed in 720 dpi full photographic quality would require 2.32 Gigabytes storage. For an InkJet printer without firmware to print face-up, it would need a large hard drive and sufficient memory to cache at least one side of a sheet, i.e. 145 Megabytes. The size of such files can present a considerable impediment to face-up printing.

Other processes, such as those used in conjunction with Windows NT and 2000 may use printing processes that use raw format files and EMF files differently than those just described, such as passing the entire EMF data for all pages to the GDI 50 in one pass, rather than one page at a time, or passing the EMF data directly to the print server without rendering the print job on the client when the EMF data is to be queued on a print server. A mirror copy of the driver on the server renders the EMF data instead.

FIG. 5 shows one such other process. Typically, a user will employ an application 100 to create a print job by calling GDI 102 functions. The GDI 102 and/or application 100 will then call a driver 104, such as the Winspool.drv which is a client interface into the spooler. This client interface exports the functions that make up the spooler's 32-bit API and provides for access to the server. The print job is then forwarded to the spooler's API server 106, such as Spoolsv.exe which can be started at the same time as the operating system. This API server module exports an RPC interface to the server side of the spooler's Win32® API. This module implements some API functions, but most function calls are passed to a print provider by means of the router 108, such as spoolss.dll.

The router 108 determines which print provider to call, based on a printer name supplied with each function call, and passes the function call to the correct provider 110, 112 or 114. If the selected printer is managed by the client system, the print job is handled by the local print provider, such as localspl.dll 110. Printers managed by the local print provider 110 do not have to be physically local to the client; they may also be directly connected to network cards or wireless interfaces without using a server. When these printers are used, the print job is passed to the kernel-mode port driver stack 116 and on to the printer 118.

When a printer connected with a Windows NT/Windows 2000 server, and its associated GDI 120 and driver 122, are selected, the router 108 directs the print job to the network print provider that redirects calls from the client's router to the network server's spoolsv.exe process 124 which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the print job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 which directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the printer's server 134 which then directs the job to the destination printer 138.

An example of these printing processes may be explained with reference to FIG. 6 which illustrates a Windows 2000 print process. In this process, an application 150 is used to initiate a print job using the Graphics Device Interface (GDI) 152. When the print job's initial output file is in raw format (not EMF) 154, the printer driver's printer graphics DLL 156 works in conjunction with the GDI 152 to create a print job that is sent to the client interface 160 of the spooler. Client interface 160 sends the job to the API server 162 which forwards the job to the router 164. In this example, the router 164 sends the job to the local print provider 165 as it is a local print job.

Within the local print provider 165, a print job creation API 168 is invoked. This APT 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format (not EMF), the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the print job is sent 154 to a client spooler interface 160, which sends the print job to the API server 162 which forwards the print job to the router 164. Again, in this example, the router 164 sends the print job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178 by the print processor 192. If the initial job file is in EMF format, the print job is sent to the print processor DLL 180 which directs the print job back to GDI 152 for conversion to raw format with the help of printer interface DLL 174. The converted print job is then sent back through the spooler client interface 160, APT server 162 and router 164 to the print provider 165. In the local print provider, the job is processed by the print job creation API 168, job scheduling API 170 and job scheduler thread 172. Because the job is now in raw format, the job is sent to a port manager 194 including a language monitor DLL 182 and on to the port monitor DLL 184 and kernel-mode port driver stack 186 before arriving at the destination printer 188.

What is desired, then, is a simple, cost effective system of achieving collated, face-up printing without the added complexity, expense, and delay of current implementations. What is further desired is a system of achieving face-up printing that may be used across a wide variety of existing printer devices as well as future printer devices.

DETAILED DESCRIPTION OF THE PREFERRED EMBODIMENT

The disclosed printing systems address the foregoing shortcomings of existing printing systems by employing a novel Page Independent Spool File Index (PISF Index) that summarizes the spool data in the spool file created by a spooler when spooling a print job. The PISF index may be accessed by a print processor, which may use the information in the PISF index to implement a variety of desired printing instructions, including without limitation, face-up or face-down printing.

Further, some embodiments of the disclosed systems may be capable of rendering spooled data to the selected printer device in a compressed or uncompressed TIFF format after accessing the PISF index when implementing printing instructions. The size of the TIFF data is comparable to that of PDL data, thus conserving limited memory or hard drive space when spooling page data to the printer device.

Figure 6:
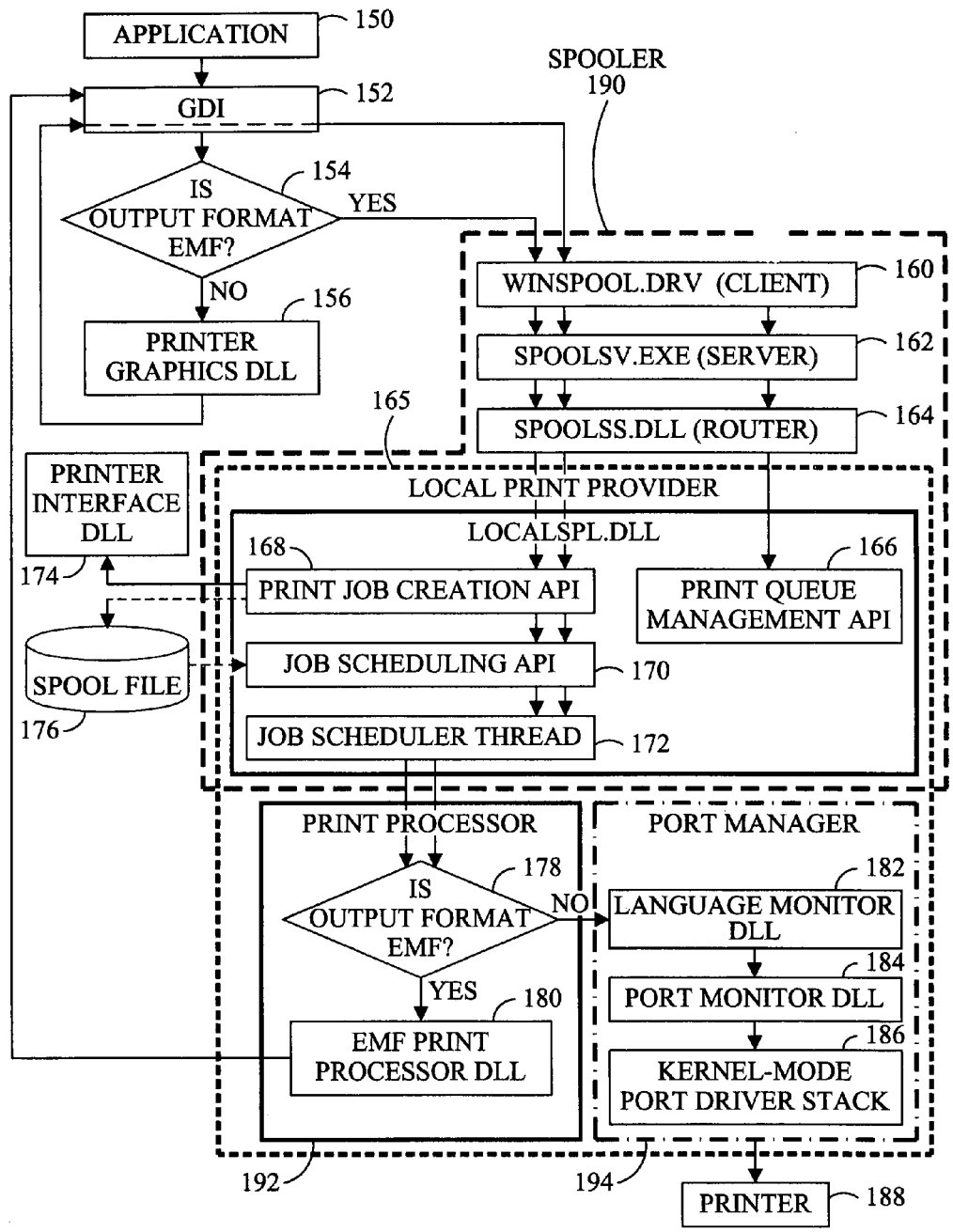
FIG. 6 shows a process for printing with the system shown in FIG. 5.

To simplify discussion of the disclosed systems, some groups of components may be referred to collectively. Referring to FIG. 6, a spooler 190 may refer to a group of components that include a spooler client interface 160, spooler API server 162, router 164, print job creation API 168, print queue management API 166, and job scheduling API components 170 and 172. A group of components comprising a language monitor 182, port monitor 184 and port driver stack 186 may be referred to as a port manager 194. A group of components comprising a file format director 178 and EMF print processor DLL 180 may be referred to as a print processor 192.

The systems disclosed herein typically operate within an environment comprising a computing device capable of spooling a print job along with one or more printing devices connected together either locally or remotely through a selective one of a number of network or peripheral sharing connections, such as a peer-to-peer connection, a network print queue, or combinations thereof, together with a printer driver and print processor compatible with the connected printing devices.

Generally, a user may initiate a print job consisting of one or more documents, each document consisting of one or more pages, and collectively consisting of one or more copies. A print job may be pre-processed into printer-ready data, such as when an application renders its output in a Page Description Language (PDL), such as Hewlett Packard's Printer Command Language (PCL), Adobe's Postscript, Adobe's Portable Document Format (PDF), a Tagged Image File Format (TIFF) or rasterized (as typically done for inkjet printers), as non-limiting examples. A print job may also be journaled, where the rendering instructions are recorded, and the playback of the rendering instructions is deferred, such as when Microsoft's Enhanced Meta File (EMF) format or Sharp's Printer Meta File (PMF) format, for example.

In many operating systems including variations of Microsoft Windows and others, a user typically selects a command, a sequence of commands, and/or some stimulus that signals the computing device that the user intends to spool a print job. The computing device may respond by presenting the user with a dialog (e.g., a Printer UI, command line query, front panel display) in which the user may select options relating to the manner in which the print job is spooled. One of these options is the selection of the printing device(s) (e.g., printer, plotter, MFP, CD burner, etc.) to which to de-spool the print job. After the user selects at least one printing device, the computing device loads a printer driver and print processor associated with the selected printing device(s) and the printer driver may respond by presenting the user with a dialog in which the user can select options relating to the printing device's capabilities. For example, and not by way of limitation, a user may select print quality, paper size, orientation, tray selection, manual feed, stapling, watermarks and other options.

In other embodiments, the print job may be initiated by another process and the selection of print options may be obtained by other means such as default settings, job tickets and other methods.

In some of these systems, the dialog presented to the user for selecting options specific to the printing device's capabilities includes a dialog on sheet assembly. Within this dialog, a user can select print order (i.e., normal order, reverse order and/or booklet), scale/placement (Duplex, Nup, PrintClub and/or Booklet), and collation (groups or sets). Embodiments may also comprise options for face-up printing.

Once the user has selected the desired options relating to the print job and/or the printing device(s), the computing device may spool the print job. The steps in this process may comprise: 1) constructing and writing job-specific information in a computer file, such as DEVMODE in Microsoft Operating Systems; 2) compiling rendering instructions; and 3) either rendering, i.e., preprocessing into printer ready data, or journaling, i.e., recording for deferred playback. A print job may already be rendered, partly or wholly, into printer ready data. In this case, the step of compiling rendering instructions may be skipped partly or entirely.

The spooled print job may additionally contain information regarding sheet assembly options selected for the print job. These options may include order, scale/placement, and collation among other options. The output is generally referred to as a spool file and the contents are generally referred to as spool data. This data may be stored on disk, in memory, in cache, or any other form of storage compatible with the computing device.

Once the spool file has been created, the computing device passes, either immediately or on a delayed basis, control of the spool file to the associated print processor for the selected printing device(s). The print processor reads the spool file and determines if the format of the file contents is pre-processed, printer-ready data such as RAW mode data in the Microsoft Operating Systems, or journaled data such as EMF data in the Microsoft Operating System.

At this point, in existing systems, the spooler passes chunks of spool data to the Print Processor, until all of the spool data has been read. The Print Processor makes no interpretation of the spool data contents, but processes the data in one of two paths, depending on whether the data is recorded for deferred playback, i.e., journaled, or printer-ready data, i.e., rendered. In some printing systems such as those used in Microsoft Windows 9x, Me, NT, 2000, XP and other systems, journaled print data may be stored in one or more spool files in Windows Enhanced Metafile (EMF) format to quickly record a print job and allow an application to continue running while the print job is completed. In other operating systems similar journaled files may be used.

If the spool file is journaled, the Graphics Device Interface (GDI) associated with the targeted printer plays back each chunk of spool data to the printer driver. In some situations, the printer driver may not accept the entire chunk of spool data and the GDI may then push the remainder back to the spool file played back again. For example, the GDI in a Microsoft operating system may play one EMF file at a time, and push back any remaining data in the chunk of spool data. In these known systems, the sheet assembly is done either by the printer driver as it renders the data or deferred to the printer firmware by prepending sheet assembly instructions to the printer-ready data that are understood by the printer firmware.

If, alternatively, the spool file contains printer ready data, each chunk of spool data is written directly to the printer port associated with the targeted printer device. Each chunk of spool data is entirely consumed when written to the printer port. The sheet assembly, if not already performed by the printer driver, must be deferred to the printer device's firmware, where the printer-ready data has prepended sheet assembly instructions that are understood by the printer device's firmware.

Figure 7:
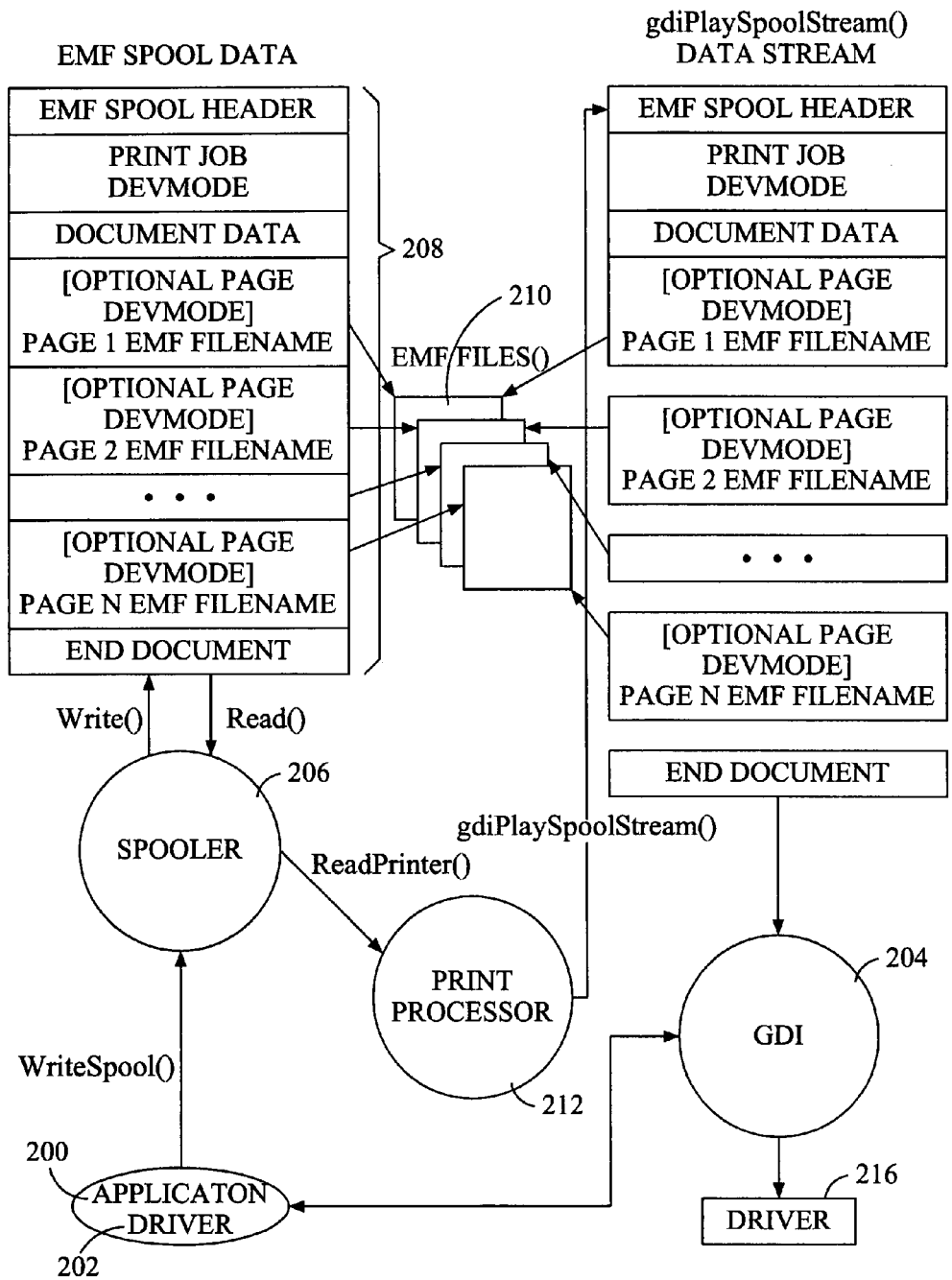
FIG. 7 shows an EMF mode printing process.
Figure 8:
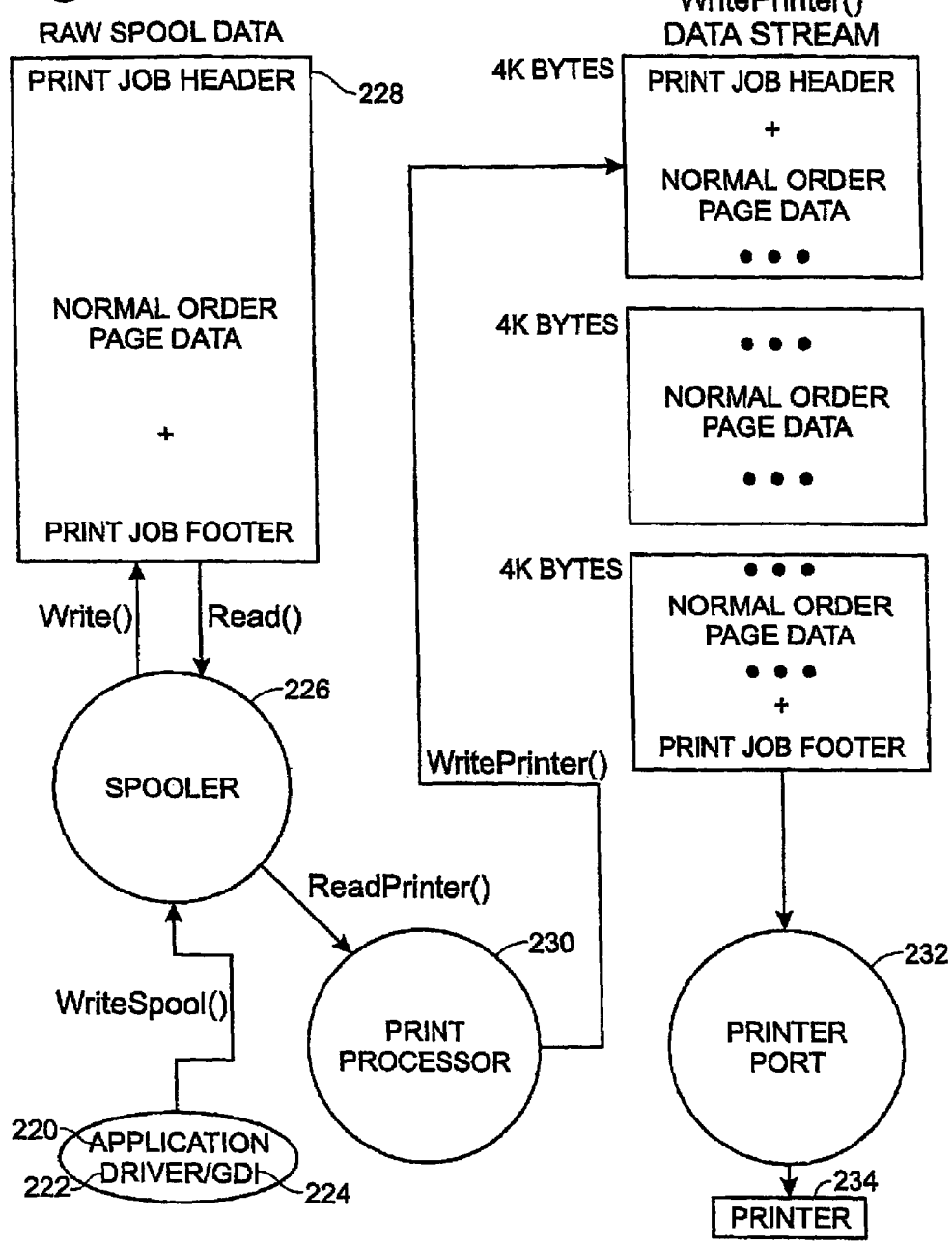
FIG. 8 shows a raw mode printing process.

Example of these existing processes are shown in FIGS. 7 and 8, where FIG. 7 shows an existing system for de-spooling journaled data to a printer device and FIG. 8 shows an existing system for de-spooling raw-format data to a printer device.

Figure 1:
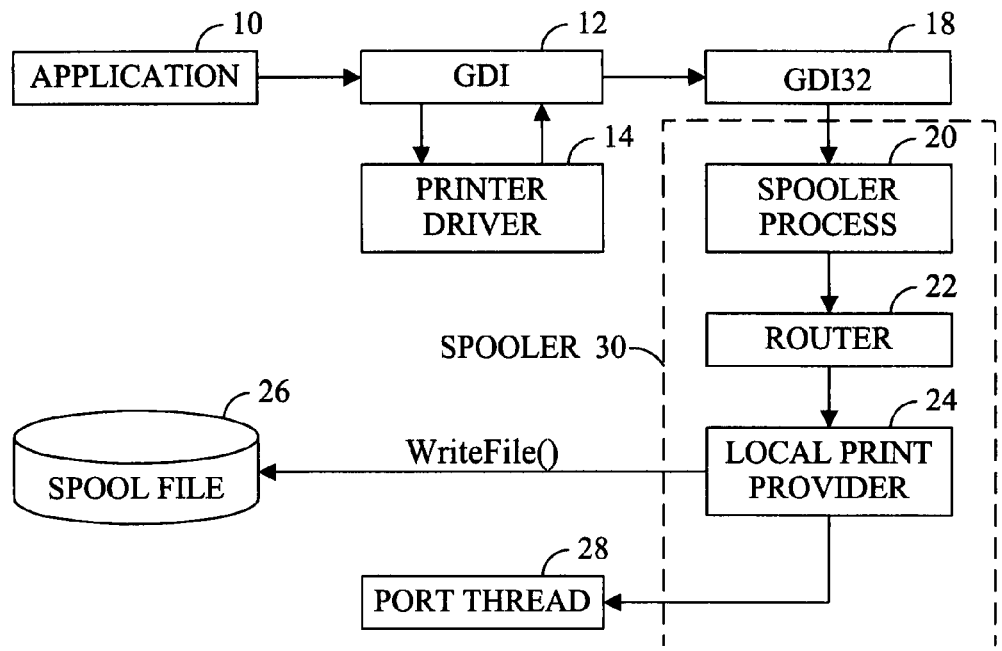
FIG. 1 shows a process for spooling a raw spool file from an application.
Figure 2:
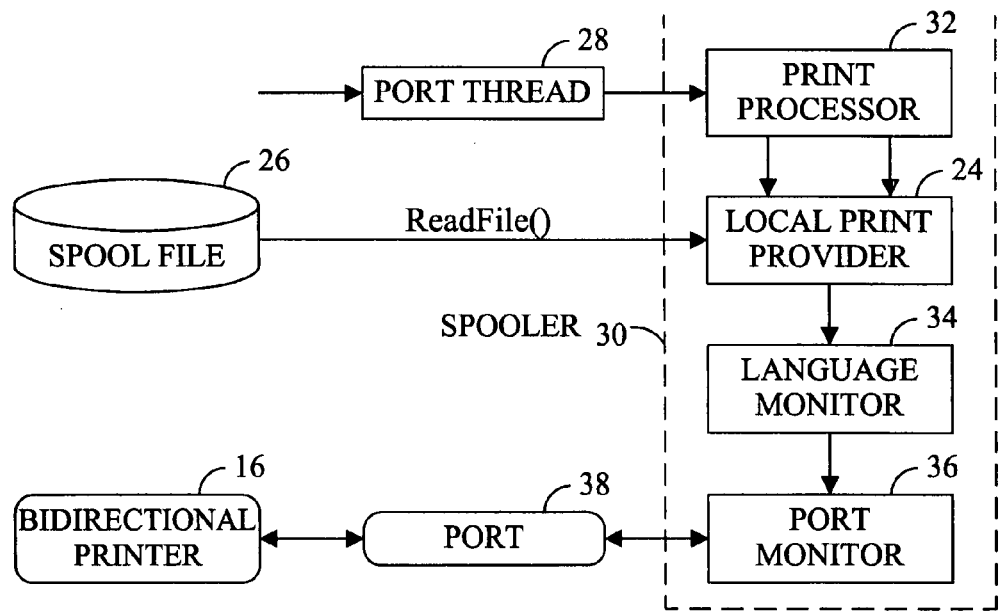
FIG. 2 shows a process for de-spooling a raw spool file to a printer.
Figure 3:
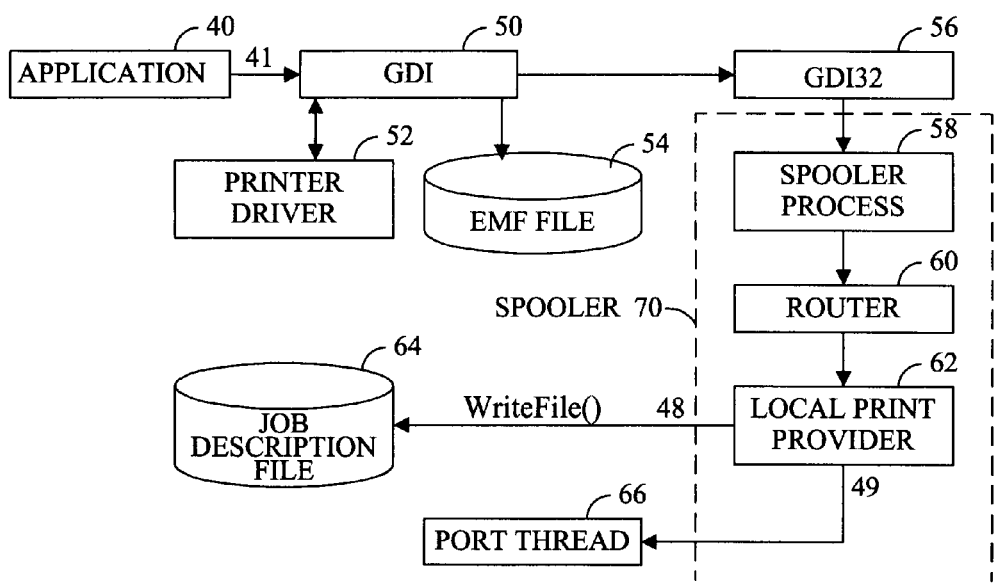
FIG. 3 shows a process for spooling an EMF spool file from an application.
Figure 4:
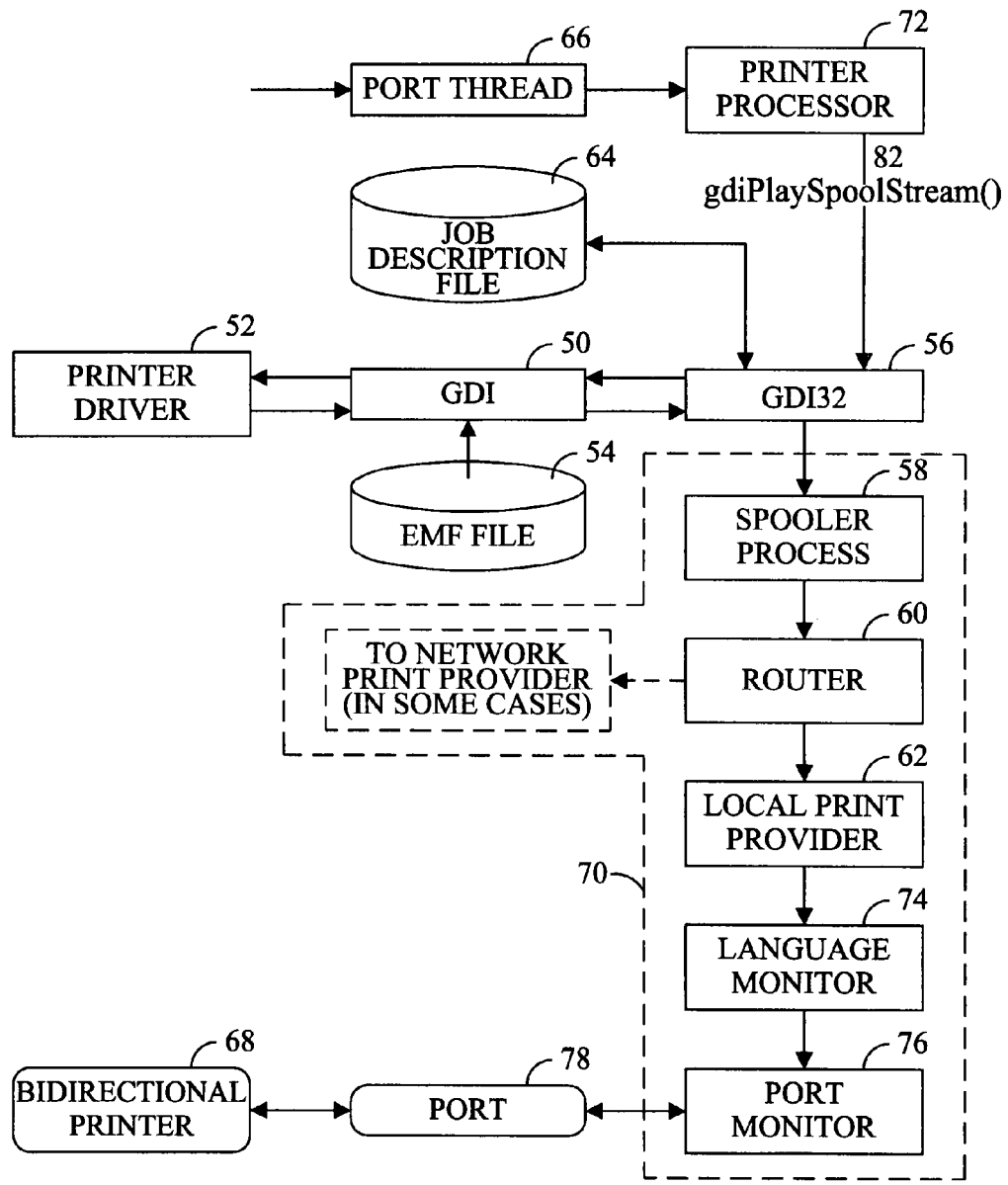
FIG. 4 shows a process for de-spooling an EMF spool file to a printer.
Figure 5:
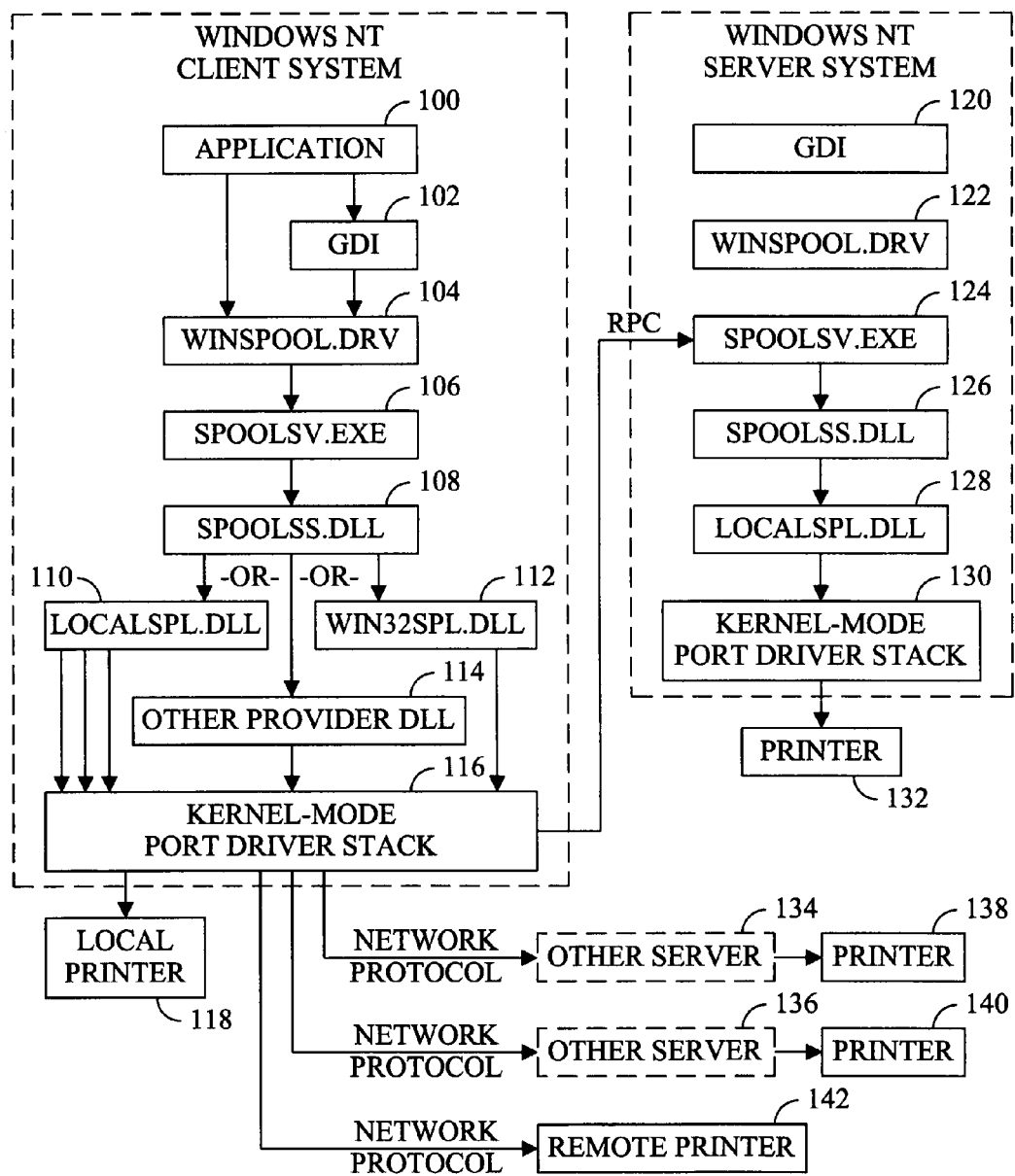
FIG. 5 shows a typical printing system used by Windows NT/2000.

In specific reference to FIG. 7, an application 200 works in conjunction with a print driver 202 and a GDI 204 to create a print job as explained above. This print job is sent to a spooler 206 which creates one or more spool data files 208 comprising print data, device initialization and environment data, such as DEVMODE data is Microsoft Windows environments, and one or more EMF filenames. In some systems, such as Windows 9x or Me systems, multiple EMF files may be created to store a multi-page print job where each sequential EMF file contains data for each corresponding sequential page of the print job. Spool data files 208 may take the form of a job description file 64 shown for example in FIG. 3, may be part of spool file 176 shown for example in FIG. 6, or may be represented in another manner depending on the particular operating system and print job type.

Once the EMF files 210 are created, control is passed to the print processor 212. When the system determines that actual printing should commence, the print processor 212 plays the print data stored in spool data file 208 and EMF files 210. This data is played to the GDI 204 which can be, for example the GDI 50 or 152 shown in FIGS. 3 and 6, respectively, where the data is converted with the help of a driver 216 to a printer-ready format that is forwarded to a printer.

Referring to FIG. 8, when a file is printed in a rendered printer-ready format (RAW mode in Microsoft Windows systems), an application 220 working with the system GDI 224 and printer driver 222 creates a print job and sends it to the spooler 226. Spooler 226 creates a spool file 228 comprising raw spool data. This data may be stored, for example, in Printer Job Language (PJL), Printer Control Language (PCL) and/or Portable Document Format (PDF). At actual printing time, the print processor 230 plays the spool file 228 to the printer port 232 where it is directed to a printer 234. Because the data is already in a rendered format in the spool file, it does not need to be processed again by the GDI 224 or driver 222.

Figure 9:
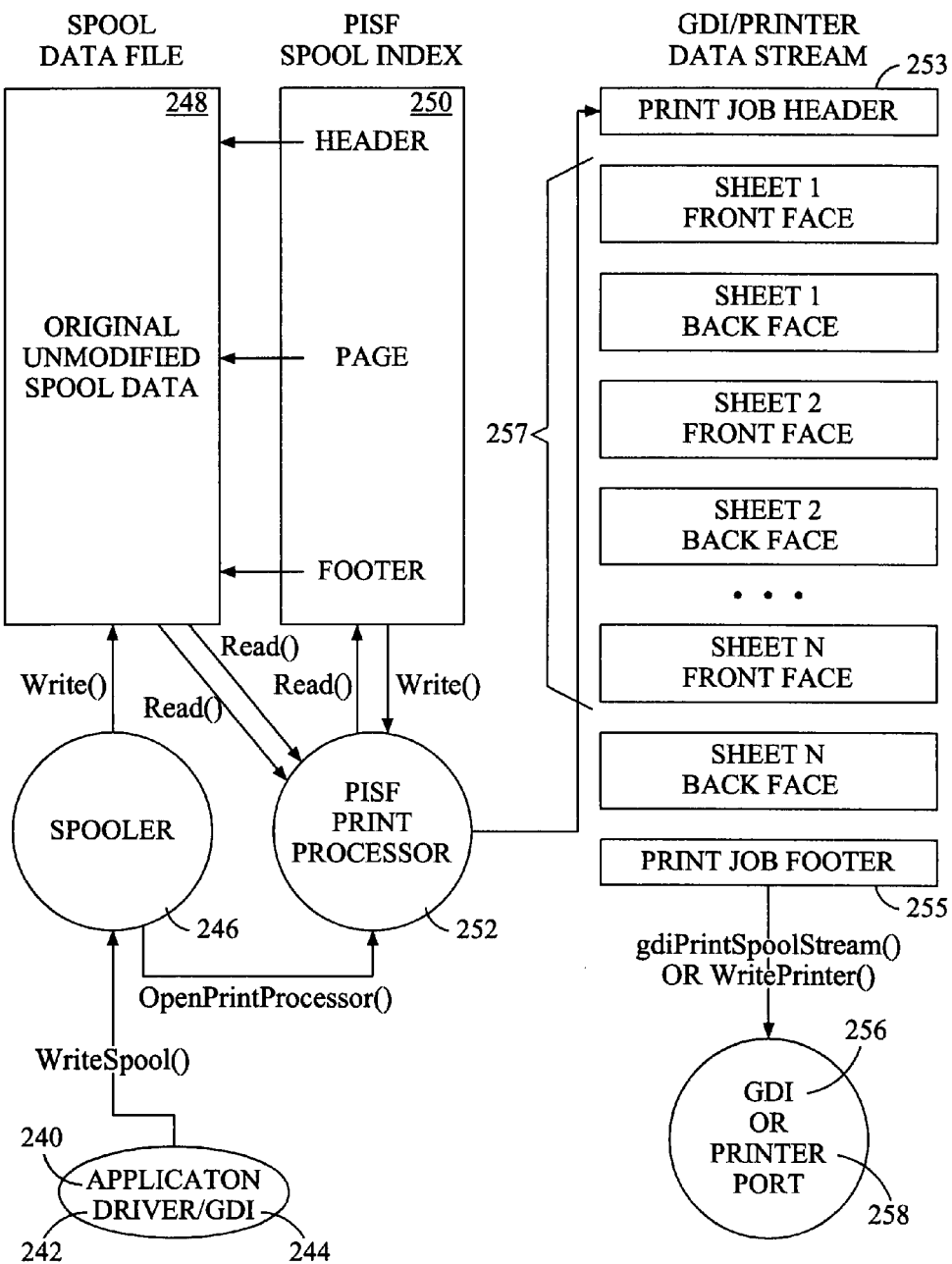
FIG. 9 shows a PISF Spool Index file of an embodiment of the present invention.

The techniques described herein provide print-processor-based, driver-independent face-up emulation for printers without firmware support of these features. These techniques can be enabled through the use of a page-independent spool format (PISF) file or spool index file as shown in FIG. 9.

Embodiments described herein improve on existing methods, described above, by parsing the spool file to generate a Page-Independent Spool File Index (i.e., PISF Spool Index), and replacing the existing Read Spool Data interface from the Spooler (e.g., ReadPrinter() on the Microsoft family of operating systems) with a PISF Index-specific Read Spool Data interface from the Print Processor.

In the example of the Microsoft family of operating systems, this can occur when the Spooler 246 initiates the despooling process by calling the OpenPrintProcessor() or other similar function of the Print Processor 252, but before the first spool data is read by the Print Processor 252, i.e., PrintDocumentOnPrintProcessor(). After the call to OpenPrintProcessor() 251, the path to the Spool Data File is available to the Print Processor 252, as is information as to whether the spool data is journaled (i.e., EMF) or printer ready data (i.e., RAW). If the spool data is printer ready data, the PDL type can be determined by examination of the first block of data, typically containing a PJL header-ending in ENTER PRINTER LANGUAGE=<PDL>. Even without a PJL header, language specific constructs (e.g., PCL, PDF, Postscript) can be quickly identified.

Once the PDL type (or EMF) is determined, a PDL (or EMF) specific parser may be invoked to parse the Spool Data File 248 and generate a PISF Spool Index file 250. The PISF Spool Index file 250, which may be represented as a disk file or in-memory data structure, contains information to partition the Spool Data File 248 into regions of spool data that correspond to the Print Job Header 253, Print Job Footer 255 and the front and back of sheets 257 to be printed.

After the PISF Spool Index 250 is generated, the print processor 252 replaces the existing ReadPrinter() Spool Interface with a PDL (and EMF) independent Spool Read function. Unlike the existing ReadPrinter() function which has no access to the contents of the Spool Data File 248, the new Read Data function will use the PISF Spool Index file 250 to return single spool data chunks corresponding to the following sequential order: Print Job Header; the front and then back of each sheet; and the Print Job Footer.

These embodiments typically comprise one or more applications 240 which generate printable documents. A print job is typically initiated when the application calls the GDI 244 and driver 242. The print job is then typically sent to the spooler 246. As explained above, the spooler 246 may comprise many components and may operate differently according to the file format of the print job and the operating system of the computing device. Generally, the spooler 246 creates a spool data file 248 which records the print job or portions thereof. The embodiments of the disclosed systems further create a PISF Spool Index file 250 that summarizes print job data in a page independent format. Once the PISF Spool Index file 250 has been created, the print processor 252 may manipulate and modify the PISF Spool Index file 250 to achieve different sheet assembly and formatting options comprising face-up emulation and others. The print processor 252 may be a customer print processor. In some embodiments, print processor 252 may also include a user interface to prompt for user preferences. A user interface may also reside elsewhere such as, but not limited to, spooler 246, driver 242 or other components. A user interface may also act as a stand-alone component which allows print system components to access its data. In other embodiments, a user interface is not required.

When the print system determines that the print job should be forwarded to the printer port 258, the print processor 252 plays back or writes the print job to the correct destination. For EMF files, the files are routed to the GDI 256 and any other components necessary for rendering the job and preparing it for transmission to the destination printer. For raw data files, the files may be written directly to the port monitor where they are directed to the printer port 258 and on to the destination printer device. However, in these embodiments, the print processor 252 reads the PISF Spool Index file 250 rather than the spool data file 248. The PISF Spool Index file 250 may be used to organize or format the print job. For example, and not by way of limitation, PISF Spool Index file 250 may convert a conventional face-down print job to a face-up format. In this manner, PISF Spool Index file 250 allows a user to change to face-up format from the print processor 252. These methods may be used to add face-up printing functionality and features to duplexing systems that previously lacked those features. While prior art systems needed specialized printer-specific drivers or specialized hardware, embodiments of the present invention can achieve the same functionality simply by replacing the print processor. Because the print processor is not a printer-specific component, a single print processor may be used to upgrade a wide array of printers to the improved functionality provided by embodiments described herein. In some embodiments, spooler components may also be used to achieve this functionality. Further, in some embodiments, the PISF Spool Index file may be used to render print data into TIFF format. In such embodiments, the spooler de-spools the spool data to the print processor 252 in sequential normal order, i.e. 1 . . . N, and immediately returns control of the computing device to the application 240 or the user. The spool data may be either raw format data, EMF data, or other form of journaled data. The print processor 252 may play back the spool data to the printer driver 242 after parsing and reversing the physical page and sheet order of the spool data using the PISF Spool Index file 260 in any one of the specific embodiments described below. Alternatively, the spooler may parse and reverse the physicals page order of the spool data either prior to the step of de-spooling the spool data to the print processor or as the spool data is de-spooled to the print processor. Still other embodiments may use another type print processor, print assist component or application, such as in Direct Printing (e.g., a driverless printing technique where the printer may render the document journal (such as TIFF) directly without prior conversion to PPL) to parse and reverse the physicals page order of the spool data, such as the Win2k print processor, prior to playback of the spool data to the printer driver 242.

If the printer driver 242 has the capability of rendering the spool data into TIFF format, the printer driver may render each single sheet (simplex) or side of a sheet (duplex) into TIFF format, i.e. a compressed bitmap, as it is received from the print processor, such as 252, and spool the TIFF data back to the spooler which de-spools the TIFF data to the associated port manager of the specified printing device. In other embodiments, an existing TIFF file may be directly spooled to the spooler without a printer driver. The Spooler and the print processor may be synchronous processes, where each side or sheet is rendered, spooled, and de-spooled in a serial process, and where only enough RAM and disk space storage for one side of a sheet is required. Alternatively, the spooler and the print processor may be asynchronous processes, where de-spooling of each side or sheet proceeds in parallel with rendering. Thus once the first side or sheet is rendered, the de-spooling can be initiated immediately or delayed. If the de-spooling is delayed, the printing source must have enough RAM and disk storage for all the TIFF data that comprise the print job. If the de-spooling is initiated immediately, the rendering process can cache the next side or sheet into memory while the previous side or sheet is de-spooling, so long as the computing device has sufficient processor speed. In this manner, the spooler may provide an uninterrupted stream of TIFF images to the port manager where only enough RAM and disk space storage for two sides or sheets is required.

The port manager may then send the TIFF images through a communication path such as a local bus or network interface to a print server, or directly to the printing device. In this instance, the total amount of traffic on the bus or network would equal the total compressed print job in rasterized mode. For example, in 2-bit monochrome, the size of a 8.5×11 sparsely populated text file at 75 dpi could be merely 1 Kb when compressed, compared to a fully rasterized, uncompressed image of 130 Kb.

Upon receipt of the print data, the printing device may immediately de-spool the print data, as would either as an Ink-Jet printer without storage or a laser printer in idle or ready-to print mode. If the printing device has sufficient storage, the printing device may optionally spool the print job internally if it is already in the process of printing a previous print job. In TIFF format, the size of the file and hence the amount of disk storage for internal spooling of print jobs can be substantially less than would be needed to store fully rasterized print jobs. Further, TIFF files do not need to be internally rendered into rasterized data, as do PDL files, thus conserving CPU and time resources.

Further, in instances where the printer device has firmware, the firmware will first recognize that the spool data is rendered in TIFF format, bypass the firmware renderer, and send the job directly to the marking engine without delay. The marking engine decompresses the TIFF data and prints the data using the information from the uncompressed rasterized image. The firmware spooler and the marking engine may be synchronous processes where each side or sheet is de-spooled and printed in a serial process, and where only enough RAM for one uncompressed side of a sheet is required.

Alternatively, the firmware spooler and the marking engine may be asynchronous processes, where de-spooling of each side or sheet proceeds in parallel with marking. Thus once the first side or sheet is de-spooled, the marking can either be initiated immediately or delayed. If the marking is delayed, the printing source must have enough RAM and disk storage for all the rasterized data that comprise the print job. If the marking is initiated immediately, the process can cache the next side or sheet into memory while the previous side or sheet is marking, so long as the computing device has sufficient processor speed. In this manner, the spooler may provide an uninterrupted stream of data to the marking engine for marking where only enough RAM and disk space storage for two sides or sheets is required.

Figure 10:
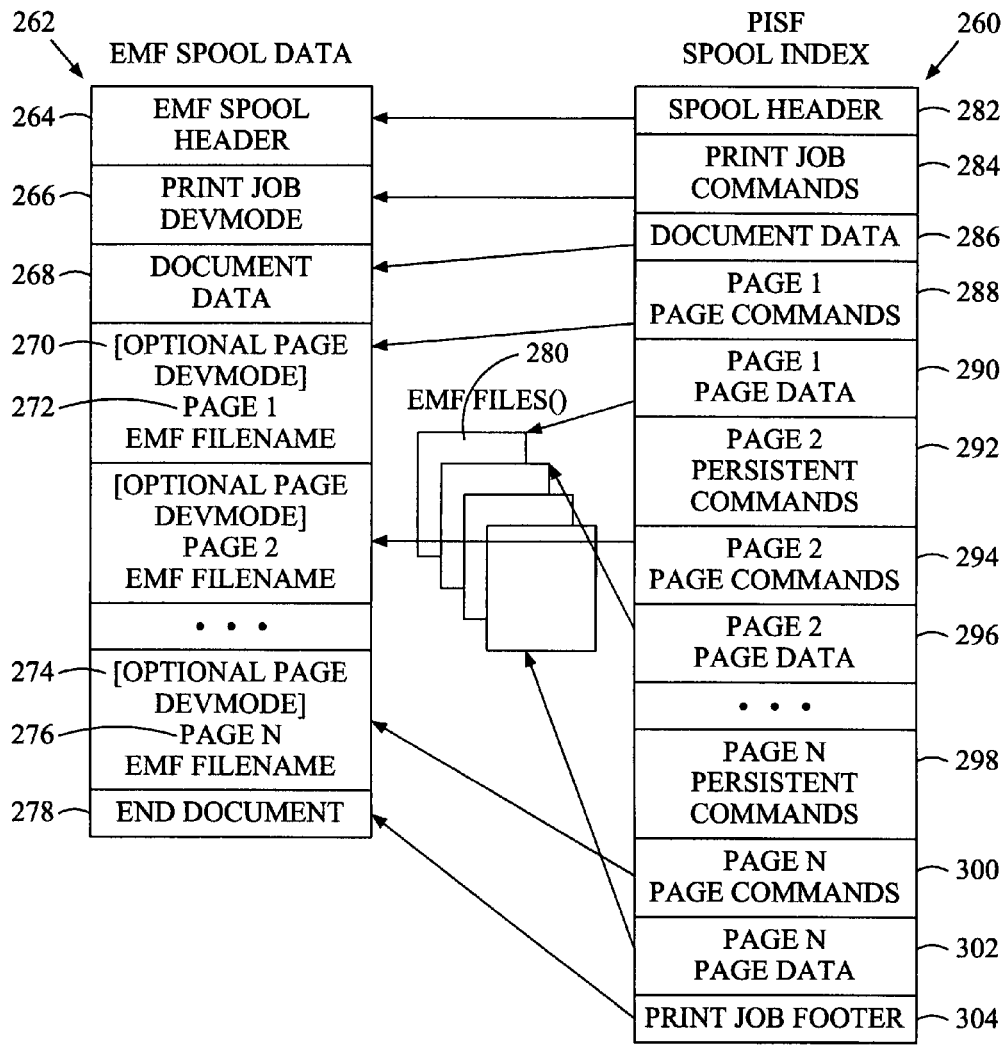
FIG. 10 shows the relationship of an EMF spool data file to a PISF Spool Index file of an embodiment of the present invention.

Details of specific embodiments of PISF Spool Index files 260 may be explained with reference to FIG. 10 which depicts an EMF spool data file 262 generating a PISF Spool Index file 260.

If the spool data is journaled, as in the case of EMF, the contents of the Spool Data File 262 already closely corresponds to the PISF Spool Index file 260. In the example of EMF, the Spool Data File 262 consists of a Spool File Header 264 for identification, a Print Job Header 266 (i.e., Print Job DEVMODE), Document Data 268 which is descriptive information on the print job but not part of the print data, a sequence of optional Page Commands 270, 274 (i.e., Page DEVMODE) and for each EMF page, Page Data 272, 276 (which may include file names). The spool date file ends with an End Document Footer 278 (i.e., Print Job Footer). In some systems, the Page Data is stored outside of the Spool Data File 262 in individual EMF Files 280.

Other systems, such as Windows NT/2000 may use a single EMF file for multiple page documents. In Windows NT/2000, EMF page data is embedded where the EMF pathname would have been in the Windows 9x format. Each EMF page data is preceded by a marker that has an offset link to the next page, thus pages can be traversed without parsing the entire file.

The PISF Spool Index file 260 comprises an ordered collection of records, each containing information for locating and extracting spool data corresponding to the respective record type. The PISF Spool Index file 260 does not contain any spool data. The PISF Spool Index file 260 may comprise the following records: 1) Spool Header 282; 2) Print Job Commands 284; 3) Document Data 286; and 4) one or more sequences of Page Persistent Commands 292, 298, Page Commands 288, 294, and 300, Page Data 290, 296, and 302, and a Print Job Footer 304.

For EMF files, the Spool Header 282, Print Job Commands 284, Document Data 286 and the Print Job Footer 304 may be mapped one-to-one with the EMF Spool Header 264, Print Job DEVMODE 266, Document Data 268, and End Document 278, respectively.

Each page begins with page commands 288, 294, and 300 that contain printing instructions for their respective pages, including instructions for page orientation, dot resolution, paper sizes, etc. These page commands 288, 294, and 300 may be optional in some embodiments. Page Data 290, 296, and 302 contain the actual data to be printed such as text, vector, and graphics. Persistent commands 292 and 298 may be any page commands that persist across page boundaries i.e., they do not get reset. When printed in normal order, the persistent data commands 292 and 298 are "inherited" along with the current page commands for the current page being printed.

For EMF files, the Page Commands 288, 294, and 300 and Page Data 290, 296, and 302 may be mapped one-to-one with the optional Page DEVMODE(s) 270 and 274 and EMF File(s) 280 respectively. If an optional Page DEVMODE 270 and 274 are present, all page commands 288, 294, and 300 inherited from the Print Job DEVMODE 266 are merged into a new Page DEVMODE 270 and 274 which overrides the Print Job DEVMODE 266 for all subsequent pages (i.e., persists) in normal order until another Page DEVMODE 270 and 274 is encountered. To preserve this relationship, the Page 1 Persistent Command record points back to the Print Job Commands 284 (i.e., Print Job DEVMODE 266), and the remaining Page Persistent Command records 292 and 298 point back, if any, to the Page Command record 288, 294, and 300 of the last previous page that had an optional Page DEVMODE 270 and 274.

EMF spool data file 262 may be a job description file 64 or similar file. EMF spool data file 262 may comprise an EMF spool header 264 and print job DEVMODE data 266 which comprises device initialization and environment data. EMF spool data file 262 will typically also comprise document data 268 and the filename(s) 272, 276 of EMF files 280 containing data to be printed in the print job. An EMF spool data file 262 may also comprise optional page DEVMODE data 270, 274. An EMF spool data file 262 is generally terminated with an end document statement 278.

In embodiments described herein that create PISF Spool Index files 260 for EMF-format data, information in the EMF spool data file 262 is indexed in the PISF file 260. PISF Spool Index file 260 comprises a spool header 282 which comprises information from the EMF spool header 264. PISF index file 260 may also comprise print job commands 284 that, in turn, comprise information related to the print job DEVMODE data 266. A PISF file 260 may also comprise document data 286 related to the document data 268 in the EMF spool data file 262. A PISF file 260 may also comprise page commands 288, 294, and 300 that may each further comprise page format and orientation data for each page of a print job. These page commands 288, 294, and 300 are related to the optional page DEVMODE data 270, 274 contained in the EMF spool data file 262. A PISF file 260 may also comprise page data 290, 296, and 302 which links to the EMF files 280 for each page in the print job. In multi-page print jobs, pages subsequent to the first page, such as page 2 and page N in this example, need to be converted to a page-independent format so that each page may be manipulated as an independent unit. This may be achieved by placing persistent commands 292, 298 in the PISF file 260. Persistent commands 292, 298 comprise page formatting, orientation, and other data that is stored as document data 268 or other data that is stored in a document-wide format in the EMF spool data file 262. A print job footer 304 is used to conclude a PISF Spool Index file 260.

Figure 11:
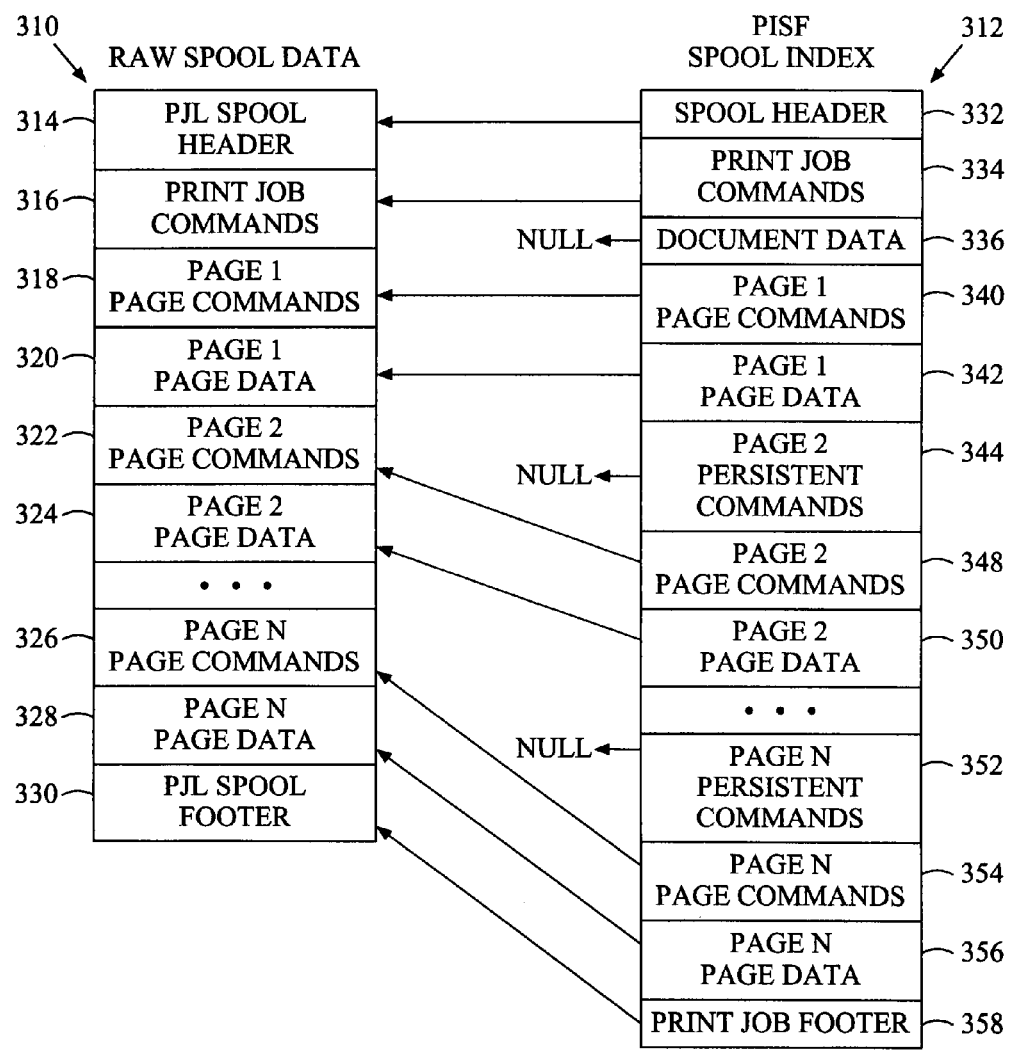
FIG. 11 shows the relationship of a raw spool data file to a PISF Spool Index file of an embodiment of the present invention when a page-independent printer language is used.

Some embodiments described herein may be used in conjunction with raw mode print jobs that use page-independent printer languages such as PCL XL, Postscript and PDF as shown in FIG. 11. When this is the case, the contents of the Spool Data File 310 already closely corresponds to the PISF Spool Index 312, with the exception that there is no persistent data 344 in page independent format. Generally, there is no document data 336 either, unless embedded in PDL-specific, non-printing comments. In these situations, a raw spool data file 310 is generated by the print system. Raw spool data file 310 comprises a header file such as Printer Job Language (PJL) spool header 314 which may identify file characteristics and location. Raw spool data file 310 also comprises print job commands 316, page commands 318, 322, and 326 and page data 320, 324, and 328. Page commands 318, 322, and 326 may comprise page formatting and orientation data. Page data 320, 324, and 328 comprise a description of the image to be printed on each page. A raw spool data file 310 may be concluded with a print job spool footer such as PJL spool footer 330.

A PISF Spool Index file 312 created from a raw spool data file 310 comprises a spool header 332 which relates information in the raw file header such as PJL spool header 314. A PISF Spool Index file 312 may also comprise print job commands 334 which comprise links to print job commands 316.

Because raw spool data file 310 is already in a page-independent format, document data 336 does not need to contain document-wide formatting and other information. Formatting data may be contained in page commands 340, 348, and 354 in a page-independent format. Data for a specific page may be contained in page commands 340, 348, and 354 as well as page data 342, 350, and 356. These file segments may contain actual print job data or, in some embodiments, may comprise rewritable links to the raw spool data file 310. Due to the page-independent format of the raw spool data file 310, persistent commands 344 are optional as their information is already stored in a page-independent format. A PISF Spool Index file 312 of these embodiments may be terminated with a print job footer 358.

For page-independent PDLs, each set of Page Commands 318, 322, and 326 and Page Data 320, 324, and 328 are independent of all other pages. In other words, if combined separately with the Print Job Commands 316, each page would print identically, as if all pages were combined together with the Print Job Command 316 because no page commands persist across the page boundaries.

Figure 12:
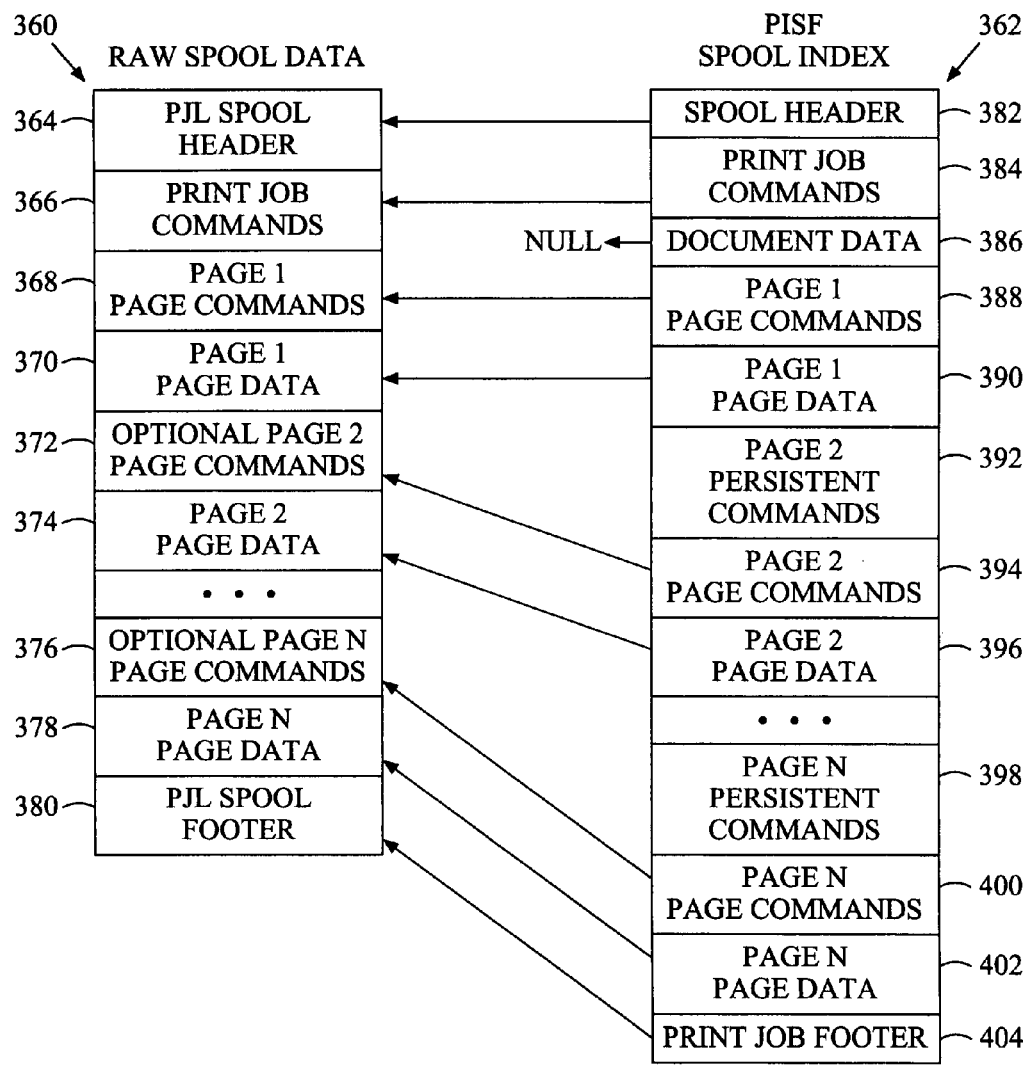
FIG. 12 shows a diagram depicting the relationship of a raw spool data file to a PISF Spool Index file of an embodiment of the present invention when a non-page-independent printer language is used.

Referring to FIG. 12, if the Spool Data is printer ready data and in page-dependent format, the contents of the Spool Data File 360 already closely correspond to the PISF Spool Index 362. Generally, there is no document data 386 as well, unless embedded in PDL-specific non-printing comments. For page-dependent PDLs, each pair of Page Commands 368, 372, and 376 and Page Data 370, 374, and 378 are not page-independent. Thus, the Page Commands 368, 372, and 376 persist to subsequent pages until overridden by another Page Command 368, 372, and 376. The persistent data is cumulative, unlike EMF-format printing where optional Page DEVMODE replace the persistent data as a whole. The Persistent Data records 392 and 398 point back to the Page Command records 388 and 394 of the previous page, which in turn contains Persistent Data records that point back to the Page Command record of its previous page. Thus, the persistent data on any one page is the recursive accumulation of the Page Command records in sequential normal order of pages 1 . . . n–1, where n is the current page.

Other embodiments of a PISF Spool Index file 362 may also be described with reference to FIG. 12. These embodiments relate to raw spool data files 360 which are in a page-dependent format such as files that use the printer command language PCL 5. These raw spool data files comprise print job information in a spool header such as a PJL spool header 364 which identifies file characteristics. Further print job formatting and orientation data may be contained in print job commands 366. This document-wide data is typically followed by page commands 368 for page one and any subsequent pages that have commands that differ from those established for previous pages. Page commands for page two 372 and other pages such as page N 376 are optional and will not generally be present unless the formatting of those pages differs from that of page one. Following page commands 368, 372, and 376, when present, will be the page data 370, 374, and 378 for those pages. Page data 370, 374, and 378 comprise the actual text and graphic elements to be printed on the media. A page-dependent raw spool data file 360 may be terminated with a print job spool footer 380, such as in PJL.

A PISF Spool Index file 362 that is related to a page-dependent raw spool data file 360 typically comprises a spool header 382, print job commands 384, page commands 388, 394, and 400, page data 390, 396, and 402, persistent commands 392 and 398 and a print job footer 404. Spool header 382 may comprise file identification information. As PISF Spool Index file 362 is an index file, it comprises links to the information stored in the raw spool data file 360. Print job commands 384 comprise links to, or information related to, formatting and orientation data for the print job as a whole. Page commands 388, 394, and 400 comprise page-specific formatting and orientation data. Page data 390, 396, and 402 comprise the text and graphics to be printed on the media. Persistent commands 392 and 398 comprise links to data necessary to make each page independent from the others. A PISF Spool Index file 362 may be terminated with a print job footer 404.

Figure 13:
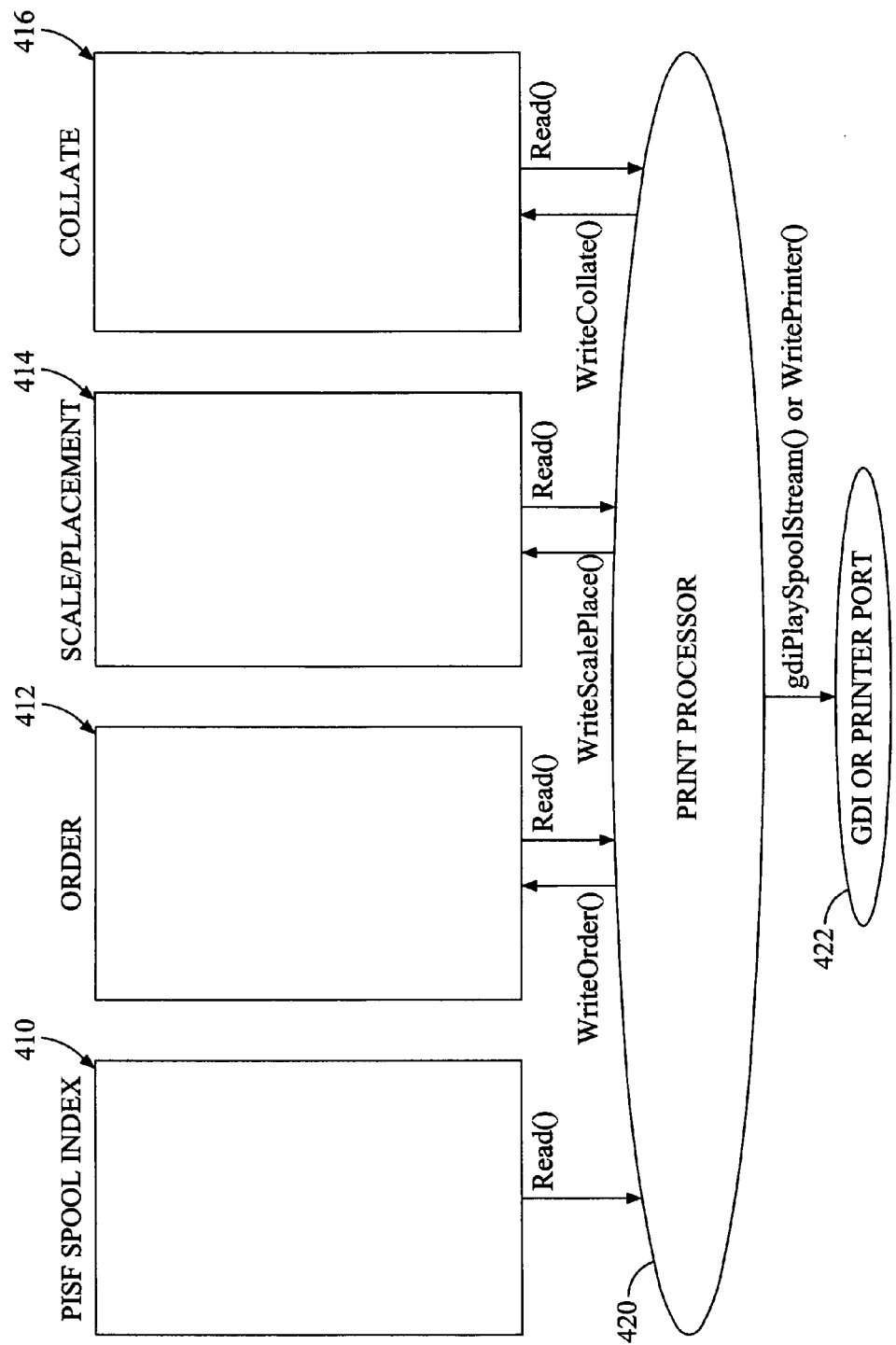
FIG. 13 shows a diagram depicting various processes of sheet assembly in some embodiments of the present invention.

Once the PISF Spool Index is generated, document output format can be modified by manipulating the PISF Spool Index file 260, 312, and 362, without any additional disk space and disk I/O. In contrast, manipulation of the spool data can require significant resources which are not always available. PISF Spool Index file manipulation may be further explained in reference to FIG. 13. First, the Spool Read function, ReadPrinter(), which reads sequential blocks directly from the Spool Data 262, 310, and 360 is replaced by a new Read Spool function that performs a virtual read I/O instead of a direct I/O. The virtual read I/O goes through the PISF Spool Index file 260, 312, 362, and 410 requesting conceptual constructs such as the Print Job Commands, data for a specific page, and Print Job Footer. The virtual read I/O uses the PISF Spool Index to locate and assemble the spool data, which may not be physically contiguous. The spool data is then returned back to the print processor 420 as a single contiguous block of spool data. The Read Spool function in the Print Processor 420 does not need to have access to the PDL (or EMF) type of the data or the Spool Data layout on the disk.

In some embodiments, face-up printing may be accomplished by manipulating the PISF Spool Index file 260, 312, 362, and 410 through a series of passes such as one or more of the following: 1) Page Order; 2) Page Scale and Placement; and 3) Sheet Collation. This Ordered Index File Processing (OIFP) provides for simple and efficient processing and manipulation of index files. Each pass transforms the current PISF Spool Index file 410 into a new PISF Spool Index file 412, 414, and 416, from which the new Read Spool function would return data in an order already assembled for the selected sheet assembly options.

In these embodiments incorporating OIFP, the first pass 412 may process the page order for sheet assembly options that implement sheet order such as reverse order, booklet, and duplex formats. The second pass 414 may process the page scale and placement for sheet assembly options, such as booklet, Nup, and PrintClub. The third pass 416 may process the sheet collation for sheet assembly options such as Collate, Sets, and Groups.

If it is desired that each pass be independent of the other passes, requiring no information from the prior passes, the passes should be performed in the following order:

1) Page Order; 2) Page Scale/Placement; and 3) Sheet Collation as required for OIFP. Alternatively, the order of the passes may be changed, but in that instance some passes may require information from previous passes.

Once the PISF Spool Index file 410 has been processed for order 412, scale and placement 414, and collation 416 to achieve the desired document formatting, the modified spool index file 416 may be read by a print processor 420 and played to the appropriate GDI, printer port, or other element 422 for printing.

Embodiments of the present invention may be used to enable face-up printing on printers which are otherwise limited to face-down printing. This can be achieved without adding hardware, storage, memory or sheet-handling mechanical apparatus.

A face-down printer is a printer that has no hard drive or other capacity to store print data, but has a roller or other mechanical apparatus that forces the output pages to be ejected to the output bin in a face-down position.

The lack of a hard drive or other storage or memory requires that the printer print each page as it is received. These printers cannot store pages and print in another order, like reverse order. Instead, a document must be printed in the order it is sent from the host computer. If page 1 is sent first and printed first, it ends up at the bottom of the output tray. When page 2 is sent and printed, it would appear on top of the first page in the output tray. With this type or printer printing in a face-up orientation, the pages would need to be printed facing upward, but in reverse order (i.e., 2, 1) thereby creating a need to hand collate any face-up job.

Many printers overcome this problem by printing in a face-down orientation. In a face-down orientation, the first page appears upside down on the bottom of the output tray. The second page appears upside down on top of the first page in the output tray. This method outputs the document with correct collation or page order, but the document is output face-down and cannot be easily identified without removal from the output tray.

Embodiments of the present invention improve on known methods by printing the pages collated face-up, instead of face-down, and without the need for a mechanical apparatus such as a roller that flips the output pages over. These methods and systems may be used in conjunction with printers and printer output in many formats and orientations.

Figure 14A:
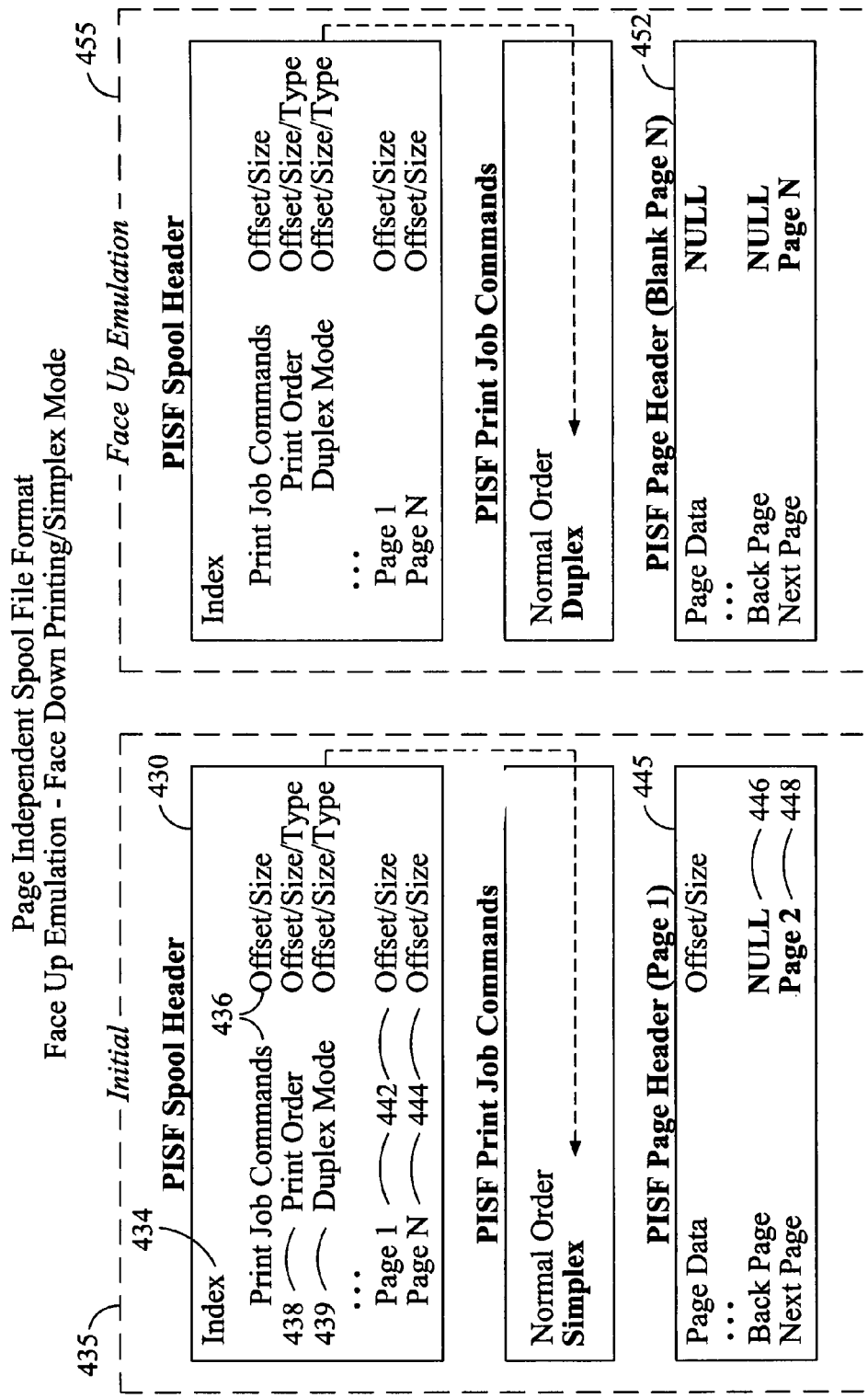
FIG. 14 shows a diagram depicting a file format for achieving face-up, collated output from a simplex, face-down print job.
Figure 14B:
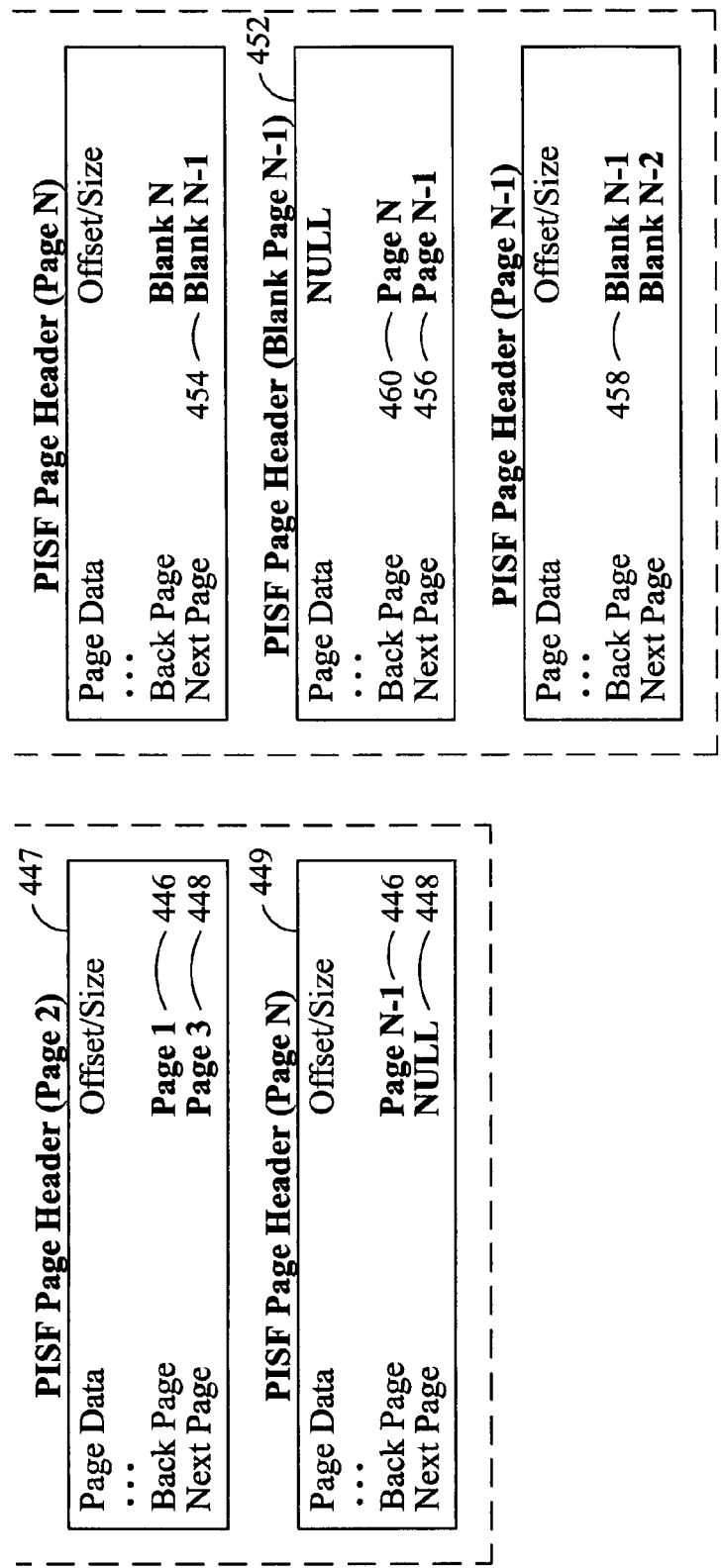

For simplex (i.e. single-sided) printing on a duplex printer that normally outputs printed documents in a face-down orientation, a PISF Spool Index may be manipulated to change the side of the paper on which output is printed and reverse the sequential order of pages sent to the printer to enable face-up output. These methods and systems may be explained with reference to FIG. 14.

A PISF Spool Header 430 contains an index 434 to locate records within the PISF Spool File 435 and manipulate them to achieve face up emulation 455. The index 434 contains information for locating the Print Job Command record 436, the location, size and data type of the Duplex Mode command index 439 within the Print Job Command record 436, and information for the Page record for the first document page 442 and last document page 444 in sequential normal order. Each Page record 445, 447, and 449 contains an index to locate the Page record for the previous page 446 and the next page 448 in sequential normal order.

This information in the PISF Index file may be used to change a Print Job Command from Simplex to Duplex in the PDL (or EMF) specific language format and to reverse the print order. The index 434 and page records 445, 447, and 449 may also be modified to change the first page to the last page and to change the last page to the first page. The index 434 may also be used to traverse each Page record 445, 447, and 449 and change the Back Page record 446 to the Next Page record 448 and change the Next Page record 448 to the Back Page record 446. This process effectively reverses the print order.

Because the job is changed from simplex to duplex format, a blank page may be inserted for the back side of each page to retain the appearance of a simplex format document. A Blank Page record 452 is inserted between each Page record by setting the Next Page record of the previous page 454 to the Blank Page record 452, the Next Page record of the Blank Page 456 to the next page, and the Back Page record 458 of the next page to the Blank Page, and the Back Page record 460 of the Blank Page to the previous page.

Below is an example output:

| Original | Face Up Emulation |
|---|---|
| Simplex | Duplex |
| Page 1 | Blank Page (flip paper over) |
| Page 2 | Page N |
| ... | ... |

| Original | Face Up Emulation |
|---|---|
| Page N | Blank Page (flip paper over) |
| | Page 2 |
| | Blank Page (flip paper over) |
| | Page 1 |

Note, in EMF mode, none of the data has been rendered yet. Therefore, the rendered data can be passed to the printer in reverse order without rendering all the pages first.

Figure 15A:
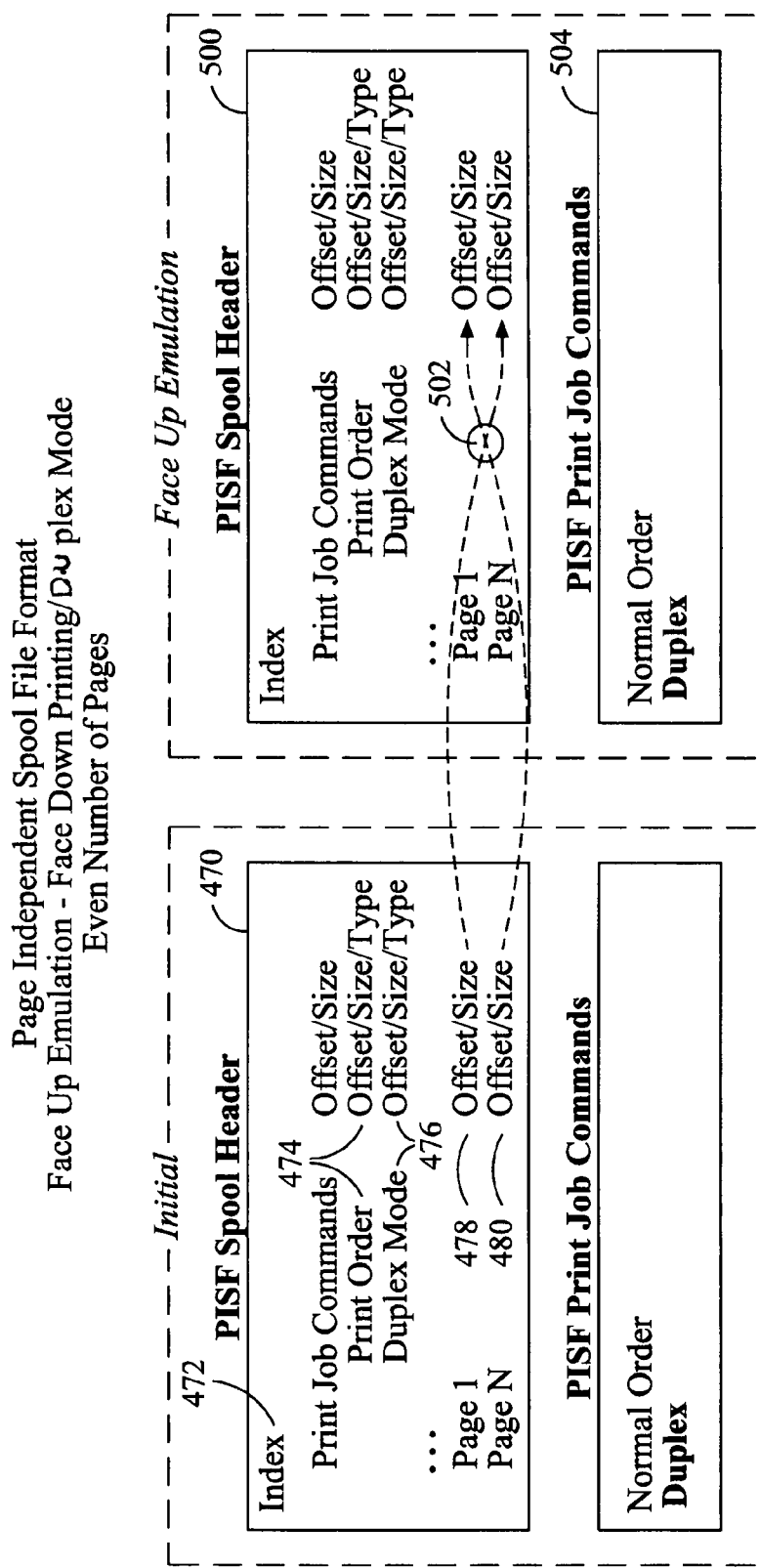
FIG. 15 shows a diagram depicting a file format for achieving face-up, collated output from a duplex, face-down print job with an even number of pages.
Figure 15B:
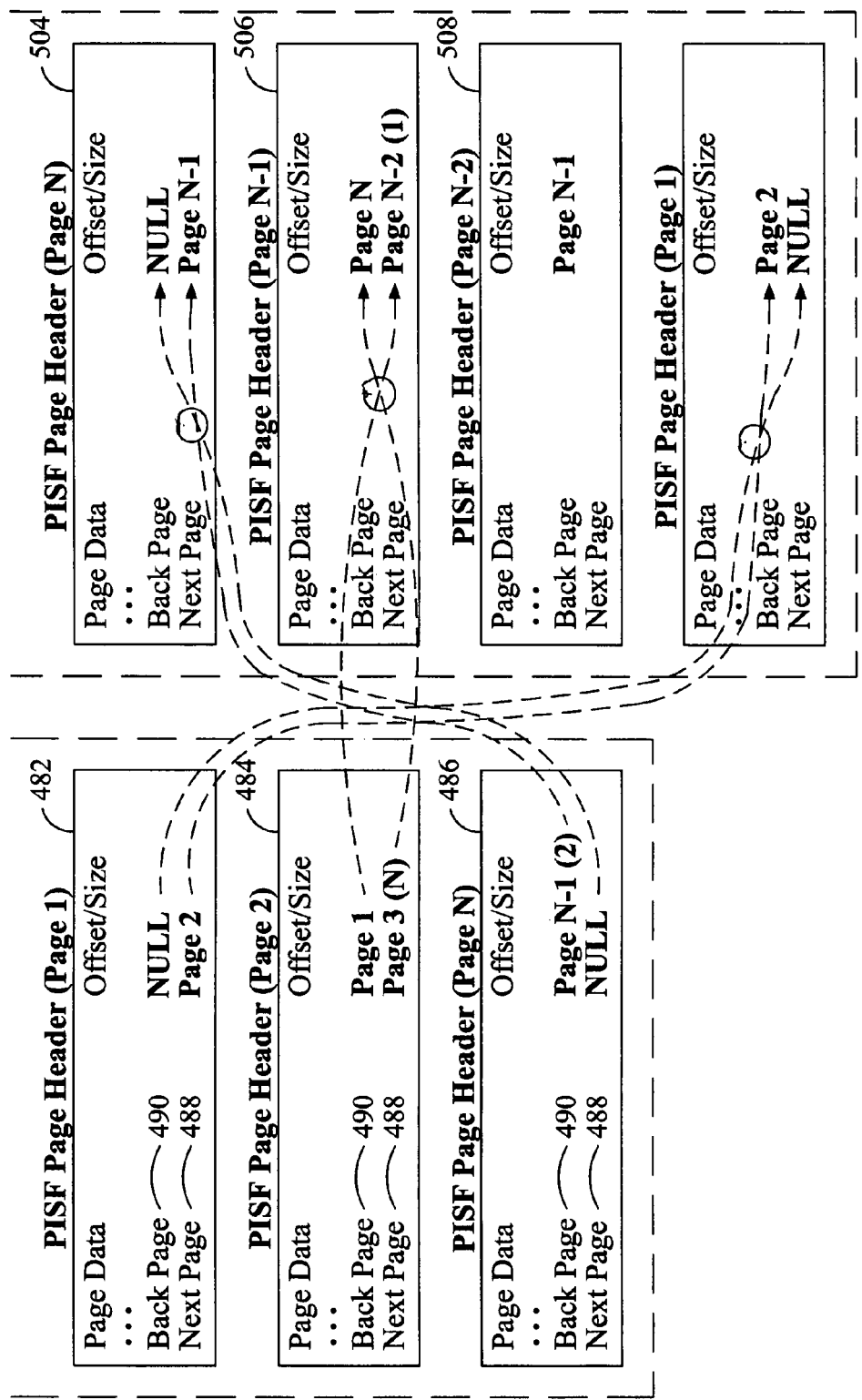

Embodiments of the present invention may also be used to convert face-down, duplex print jobs to a face-up orientation without the addition of hardware, memory or mechanical apparatus. These embodiments may be explained with reference to FIG. 15.

To accomplish this conversion for duplex (i.e. double-sided) printing on a face-down printer, the PISF Spool Index file may be manipulated to both change the side of the paper on which the first printed page is printed if the job contains an odd number of pages, and reverse the sequential order of pages sent to the printer. This process ensures that the blank side of a page at the end of a document with an odd number of pages remains at the back of the document when the print order is reversed.

The PISF Spool Header 470 contains an index 472 to locate records within the PISF Spool File. The index 472 contains information for locating the Print Job Command record 474, the location, size and data type of the Duplex Mode command index 476 within the Print Job Command record 474, and information for the Page record for the first page 478 and last page 480 in sequential normal order. Each Page record 482, 484, and 486 contains an index to locate the Page record for the previous page (back page) 490 and the next page 488 in sequential normal order.

This information is used to change the Print Job Command from face-down to face-up in the PDL (or EMF) specific language format. This may be done by modifying 502 the index 470, 500 so that the first printed page is the last page of the document, and the last printed page is the first page of the document. Each Page record 504, 506, and 508 is also modified and the index is changed so that the Back Page records 490 and the Next Page records 488 reflect the reverse of the initial page order.

Figure 16A:
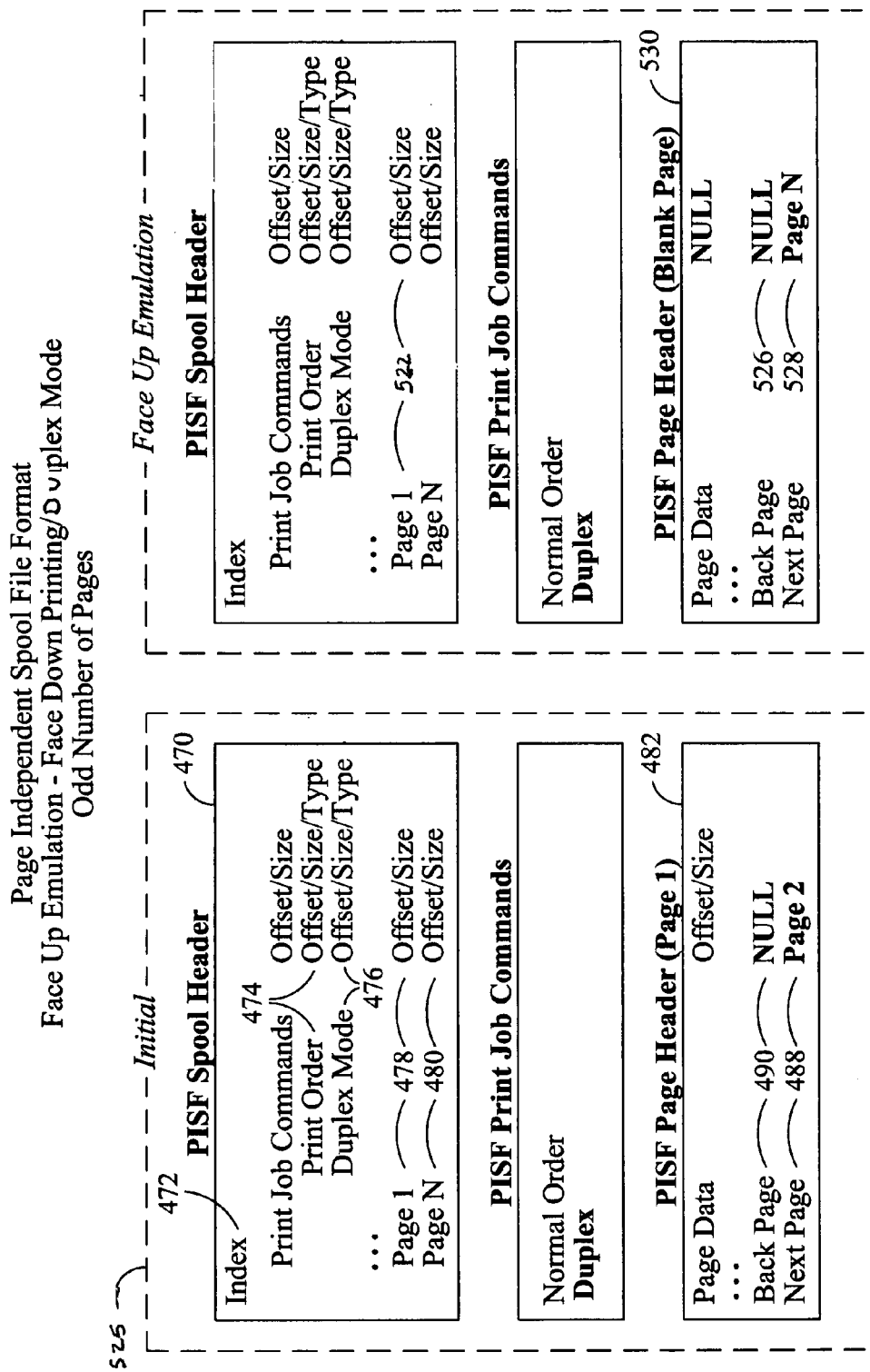
FIG. 16 shows a diagram depicting a file format for achieving face-up, collated output from a duplex, face-down print job with an odd number of pages.
Figure 16B:
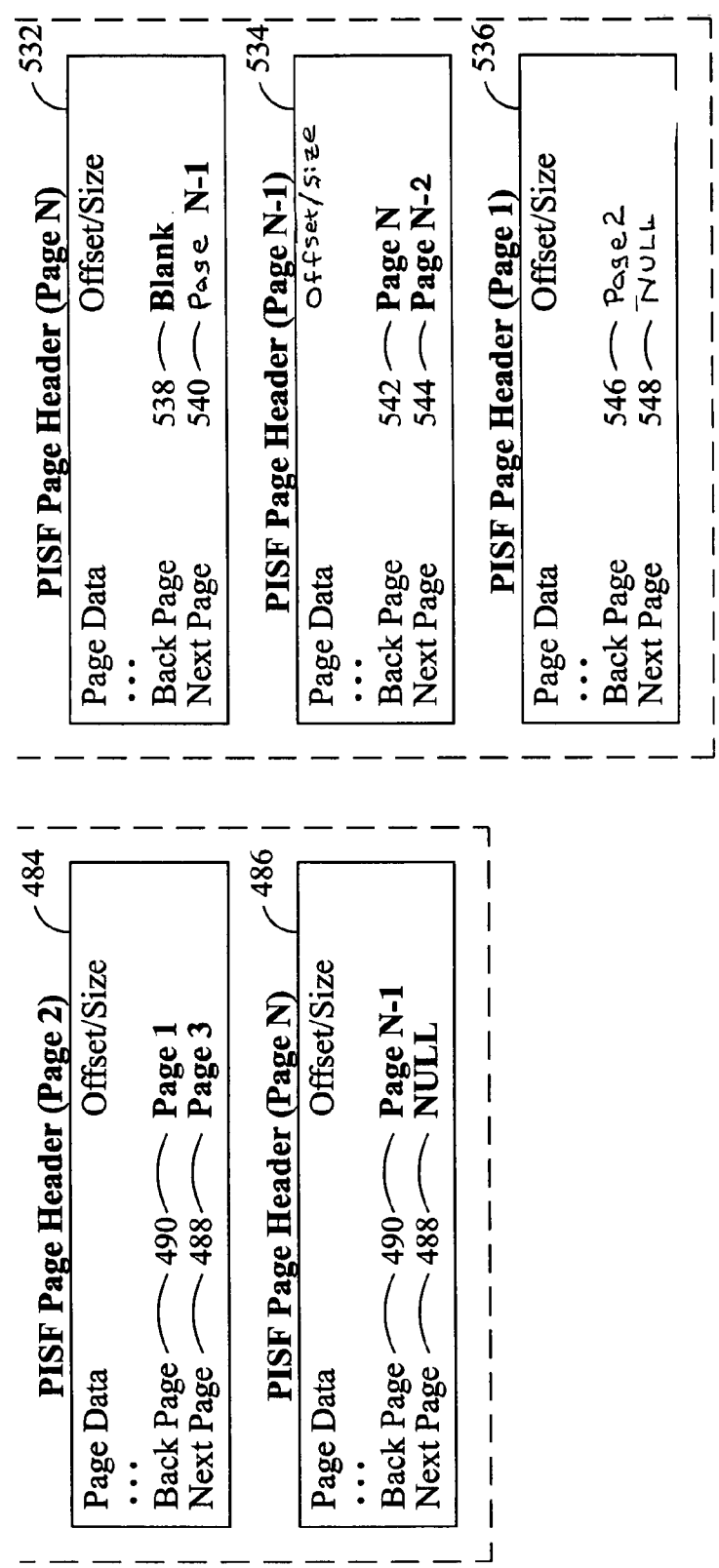

When a document contains an odd number of pages, a blank page face may be inserted to correct collation problems caused by page order reversal. An embodiment of this method is illustrated in FIG. 16. The document in the example shown on FIG. 16 has three pages. When printed in duplex mode the last page of the document is printed on the front face of the last page and the back face of the last page is blank. When the printing order is reversed, the final blank page face is moved to the front of the printing order. Accordingly, the blank page face is printed first and a blank page is inserted into the PISF spool file to achieve this end.

As shown in the example in FIG. 16, PISF spool file 525 includes the reversed page order and the inserted blank page 530. In file 525, the first page record 478 is changed to a blank page 522 and the last page record 480 is changed to page 1 of the initial document page order. Further, the back page record 526 for blank page 530 is set to null as it is now the first page to be printed. The next page record 528 for this page is set to page N 528 (the last page of the document in the initial page order).

The next page 532 in the modified print order is the final page of the document, page N. This page's back page record is changed to the blank page 538 and its next page record 540 is changed to N−1 or page 2 of the initial document order. The records for the following page to be printed 534 reflect a back page record 542 set to page N and a next page record 544 set to N−2 or, in this example page 1 of the original document in its initial page order. The final page record 536 comprises a back page record 546 set to page N−1 or page 2 in this example and a next page record 548 set to null as this is the last printed page. These formatting changes effectively reverse the printing order and flip the printed pages to the opposite side of each sheet so that the print job arrives face-up in the printer output bin with correct collation.

Below is an example output:

| Original | Face Up Emulation |
|---|---|
| Duplex | Duplex |
| Page 1 | Blank Page (flip paper over) |
| Page 2 | Page N |
| ... | ... |
| Page N | Page 2 |
|  | Page 1 |

For an even number of pages, the first sheet does not need to be flipped. Below is an example output:

| Original | Face Up Emulation |
|---|---|
| Duplex | Duplex |
| Page 1 | Page N |
| Page 2 | Page N-1 |
| ... | ... |
| Page N | Page 1 |

Note, in EMF mode, none of the data has been rendered yet. Therefore, the rendered data can be passed to the printer in reverse order without rendering all the pages first.

Figure 17A:
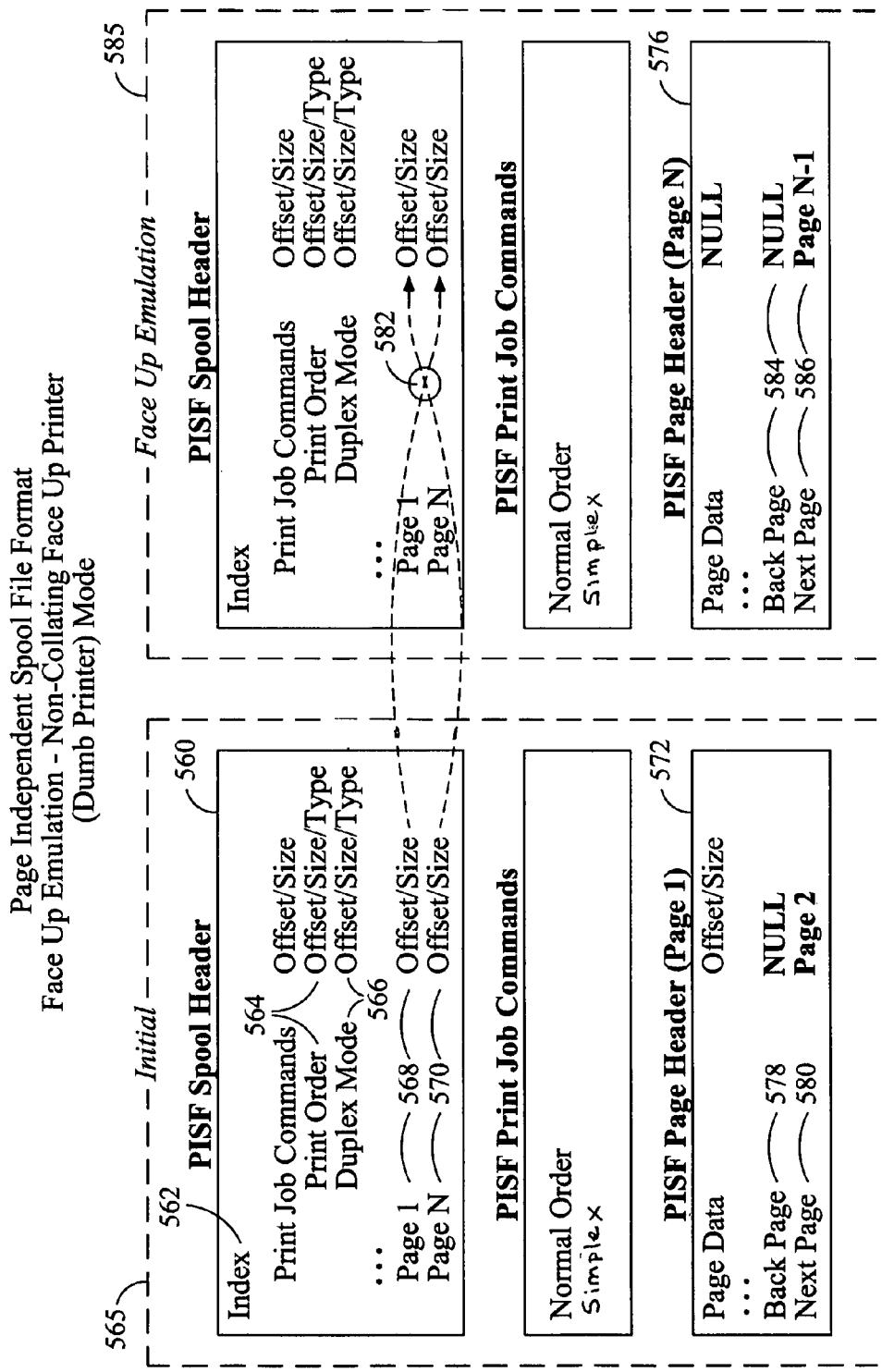
FIG. 17 shows a diagram depicting a file format for achieving face-up, collated output from a non-collated, face-up print job.
Figure 17B:
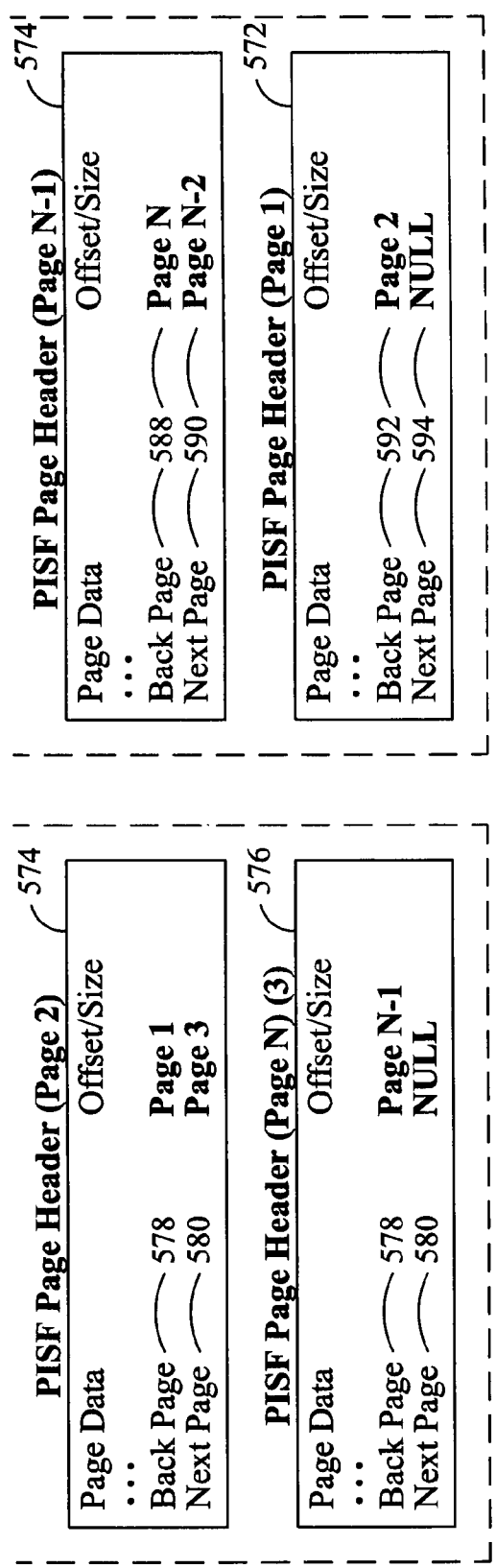

Embodiments described herein may also be used to provide face-up and collation capabilities to so-called "dumb" printers that otherwise have no collation capability. These embodiments may be explained with reference to FIG. 17.

A non-collating face-up printer is a printer that has no hard drive and no other capacity to store print data and has no extra mechanical apparatus (i.e., roller) that enables the printer to flip the printed page upside down before being ejected to the output bin.

The lack of a hard drive requires the printer to print each page as it is received; that is, it cannot store pages and print in another order, such as reverse order. The lack of the extra hardware requires the printer to eject the paper face up, and therefore the output comes out in reverse order (non-collated).

To accomplish this on a non-collating, face-up printer, the PISF Spool Index file may be manipulated to reverse the sequential order of pages sent to the printer.

The PISF Spool Header 560 contains an index 562 to locate records within the PISF Spool Index file 565. The index 562 contains information for locating the Print Job C command record 564, the location, size and data type of the Duplex Mode command index 566 within the Print Job Command record 564, and information for the Page record for the first page 568 and last page 570 in sequential normal order. Each Page record 572, 574, and 576 contains an index to locate the Page record for the previous page (back page) 578 and the next page 580 in sequential normal order.

This may be done by modifying the PISF Spool Index file 565 to reverse the print order. Order reversal is achieved by swapping 582 the first page record 568 and the last page record 570 and by modifying the back page record 578 and next page records 580 in the page record headers 572, 574, and 576 to link the records in reverse order. In the example shown in FIG. 17, initial PISF Spool Index file 565 is modified to form face-up PISF Spool Index file 585. This is done by swapping 582 the first page record 568 and last page record 570. The page record order is also reversed in the file 585 where original order—page 1 (572), page 2 (574) and page 3 (576) in file 565 is reversed to page 3 (576), page 2 (574) and page 1 (572) in file 585.

Within each page record 572, 574, and 576, the back page 578 and next page 580 records are also modified. In the page header 576 of the first page to be printed in the face-up order, page N, the back page record 584 or page 3 in this example, is set to null and the next page record 586 is set to page N−1 or page 2 in this example. In the page header for the second page 574 to be printed in the face-up order, the back page record 588 is set to page N or page 3 in this example, and the next page record 590 is set to page N-2 or page 1 in this example. Finally, the page header for the last page 572 to be printed in the face-up order will comprise a back page record 592 set to page 2 and a next page record 594 set to null. These page records effectively link the pages in reverse order thereby providing collated output on a printer that otherwise had no collation capability.

Below is an example output:

| Original | Face Up Emulation |
|---|---|
| Page 1 | Page N |
| Page 2 | ... |
| ... | Page 2 |
| Page N | Page 1 |

Note, in EMF mode, none of the data has been rendered yet. Therefore, the rendered data can be passed to the printer in reverse order without rendering all the pages first.

Some embodiments of the present invention used in conjunction with Windows NT/2000 systems may "fool" the system into processing a print job locally to enable some features of these embodiments. One method in which this may be done is by assigning a network device to a client parallel port, LPT1. This method makes the operating system believe it is printing to a local printer when output is actually redirected to a network device.

Some embodiments of the present invention operate in conjunction with, or as a part of, a server's print processor. Other embodiments of the present invention may be used in conjunction with or as a part of the spooling and despooling subsystems of the Apple MacIntosh Operating System, Linux Operating System, System V Unix Operating Systems, BSD Unix Operating Systems, OSF Unix Operating Systems, and IBM Mainframe MVS Operating System, as well as other operating systems.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. A method for providing collated, face-up printing, said method comprising:
   (a) creating a spool data file containing spool data;
   (b) creating a page-independent index file from said spool data file;
   (c) manipulating said index file with a driver-independent print processor, separate from the print driver that executes said print job, to effect collated, face-up printing, where said driver-independent print processor replaces an existing Read Spool Data interface in said spool data file with a replacement Read Spool Data interface;
   (d) rendering said spool data in TIFF format by accessing a printer driver or direct printing pre-existing TIFF format files; and
   (e) executing a print job by accessing said index file.

2. The method of claim 1 where said step of rendering said spool data in TIFF format and said step of executing a print job occur synchronously.

3. The method of claim 1 where said step of rendering said spool data in TIFF format and said step of executing a print job occur asynchronously.

4. The method of claim 3 where said step of executing a print job does not begin until said step of rendering said spool data in TIFF format is completed.

5. The method of claim 1 wherein said spool data file is a Microsoft Windows Job Description File.

6. The method of claim 1 wherein said manipulation comprises changing the order in which pages are printed.

7. The method of claim 1 where said existing Read Spool Data interface comprises ReadPrintero().

8. The method of claim 1 wherein said index file provides access to at least one Enhanced Metafile (EMF) file.

9. The method of claim 1 wherein said index file provides access to at least one raw format file.

10. The method of claim 1 wherein said print processor replaces said existing Read Spool Data interface in said spool data file with said replacement Read Spool Data interface after despooling is initiated and before the first spool data is read by the print processor.

11. A method for providing driver-independent, printer-independent collated, face-up printing in a printing system, said method comprising:
    (a) creating a spool data file containing spool data;
    (b) creating a Page-Independent Spool File (PISF) index file from said spool data file;
    (c) allowing manipulation of said PISF index file with a driver-independent-print processor, separate from the print driver that executes said print job, to effect collated, face-up printing, where said driver-independent print processor replaces an existing Read Spool Data interface in said spool data file with a replacement Read Spool Data interface;
    (d) rendering said spool data in TIFF format by accessing a printer driver; and
    (e) accessing said PISF index file to execute a print job in TIFF format.

12. The method of claim 11 where said step of rendering said spool data in TIFF format and said step of accessing said PISF index file occur synchronously.

13. The method of claim 11 where said step of rendering said spool data in TIFF format and said step of accessing said PISF index file occur asynchronously.

14. The method of claim 13 where said step of accessing said PISF index file does not begin until said step of rendering said spool data in TIFF format is completed.

15. A method for providing face-up, collated output in a printing system, said method comprising:
    (a) creating a page-independent spool index file;
    (b) manipulating said index file with a driver-independent print processor. separate from the print driver that executes said print job, to effect face-up, collated output, where said driver-independent print processor replaces an existing Read Spool Data interface in said spool data file with a replacement Read Spool Data interface;
    (c) rendering said output in TIFF format; and
    (d) accessing said manipulated index file to execute a print job.

16. The method of claim 15 wherein said creating, said manipulating and said accessing are accomplished through a print processor.

17. The method of claim 15 wherein said creating, said manipulating and said accessing are accomplished through a spooler.

18. The method of claim 15 wherein said creating, said manipulating and said accessing are accomplished through a print assistant between a driver and a printer.

19. A method for adding collated, face-up output capability to a printing system, said method comprising:
    (a) initiating a print job for a document;
    (b) creating a page-independent spool index file;
    (c) modifying said index file with a driver-independent print processor. separate from the print driver that executes said print lob, to reconfigure said print job to output in a face-up, collated orientation, where said driver-independent print processor replaces an existing Read Spool Data interface in said spool data file with a replacement Read Spool Data interface;
    (d) rendering said print job in TIFF format; and
    (e) accessing said modified index file, to obtain document formatting information for printing.

20. The method of claim 19 wherein said index file is produced by a print system component in a print system between a driver or direct printing application and a printer.

21. A printing system with driver-independent, printer-independent document formatting, said system comprising a print processor that comprises:
    (a) an indexer for creating a page-independent index file;
    (b) a driver-independent print processor. separate from the print driver that executes said print job, for modifying said index file to produce print output in a face-up, collated orientation, where said driver-independent print processor replaces an existing Read Spool Data interface in said spool data file with a replacement Read Spool Data interface; and
    (c) a renderer for rendering said print output in TIFF format; and
    (d) a reader for accessing said manipulated index file to execute a modified print job.

22. A computer-readable medium comprising computer-executable instructions for driver-independent, printer-independent collated, face-up printer output, said instructions comprising the acts of:
    (a) creating a page-independent index file;
    (b) manipulating said index with a driver-independent print processor file, separate from the print driver file that executes said print job, to effect a collated, face-up output orientation, where said driver-independent print processor replaces an existing Read Spool Data interface in said spool data file with a replacement Read Spool Data interface;

(c) rendering said printer output in TIFF format; and
(d) accessing said manipulated index file to execute a print job.

23. A computer-readable data signal embodied in an electronic transmission over a tangible medium, said signal having the function of driver-independent, printer-independent collated, face-up printer output, said signal comprising computer-executable instructions for:
(a) creating a page-independent index file;
(b) manipulating said index file with a driver independent print processor, separate from the print driver that executes said print job, to effect a collated, face-up output orientation;
(c) rendering said printer output in TIFF format; and
(d) accessing said manipulated index file to execute a print job, where said driver-independent print processor replaces an existing Read Spool Data interface in said spool data file with a replacement Read Spool Data interface.

* * * * *